United States Patent
Araki

(10) Patent No.: US 11,423,054 B2
(45) Date of Patent: *Aug. 23, 2022

(54) INFORMATION PROCESSING DEVICE, DATA PROCESSING METHOD THEREFOR, AND RECORDING MEDIUM

(71) Applicant: NEC Corporation, Tokyo (JP)

(72) Inventor: Takuya Araki, Tokyo (JP)

(73) Assignee: NEC CORPORATION, Tokyo (JP)

(*) Notice: Subject to any disclaimer, the term of this patent is extended or adjusted under 35 U.S.C. 154(b) by 275 days.

This patent is subject to a terminal disclaimer.

(21) Appl. No.: 16/131,311

(22) Filed: Sep. 14, 2018

(65) Prior Publication Data
US 2019/0012366 A1    Jan. 10, 2019

Related U.S. Application Data

(63) Continuation of application No. 14/769,859, filed as application No. PCT/JP2013/084305 on Dec. 20, 2013, now Pat. No. 10,140,354.

(30) Foreign Application Priority Data

Mar. 1, 2013 (JP) ................................. 2013-040645

(51) Int. Cl.
*G06F 16/28* (2019.01)
*G06F 16/23* (2019.01)
(Continued)

(52) U.S. Cl.
CPC ........ *G06F 16/285* (2019.01); *G06F 16/2282* (2019.01); *G06F 16/23* (2019.01);
(Continued)

(58) Field of Classification Search
CPC ........ G06F 16/285; G06F 16/23; G06F 16/24; G06F 16/583; G06F 16/2282; G06F 16/5838
See application file for complete search history.

(56) References Cited

U.S. PATENT DOCUMENTS

| 6,370,549 B1 | 4/2002 | Saxton |
| 2002/0154144 A1 | 10/2002 | Lofgren ............ G06F 17/30247 345/634 |

(Continued)

FOREIGN PATENT DOCUMENTS

| JP | 2002-024229 A | 1/2002 |
| JP | 2002-183205 A | 6/2002 |

(Continued)

OTHER PUBLICATIONS

U.S. Office Action for U.S. Appl. No. 16/130,061 dated Sep. 18, 2019.
(Continued)

*Primary Examiner* — William B Partridge
*Assistant Examiner* — Fatima P Mina
(74) *Attorney, Agent, or Firm* — Sughrue Mion, PLLC

(57) ABSTRACT

An information processing device includes: a feature quantity obtaining unit which obtains a feature quantity of an object to be extracted, which is extracted from a retrieval target, and specific information to be specified an appearing location of it; a feature quantity holding unit which, when storing the feature quantity in a feature quantity table, adds new identification information to the feature quantity and holds the feature quantity in the feature quantity table when a similar feature quantity in which a similarity with the feature quantity is no less than a threshold is not included in the feature quantity table, and outputs identification information of the similar feature quantity as identification information of the feature quantity when the similar feature quantity is included in the feature quantity table; and a retrieval table holding unit which holds the specific information associated with the added identification information or the outputted identification information.

9 Claims, 17 Drawing Sheets

(51) Int. Cl.
  *G06F 16/24* (2019.01)
  *G06F 16/583* (2019.01)
  *G06F 16/22* (2019.01)
(52) U.S. Cl.
  CPC ............ *G06F 16/24* (2019.01); *G06F 16/583* (2019.01); *G06F 16/5838* (2019.01)

(56) References Cited

U.S. PATENT DOCUMENTS

| | | | |
|---|---|---|---|
| 2006/0069876 A1* | 3/2006 | Bansal | G06F 12/121 711/134 |
| 2006/0204103 A1 | 9/2006 | Mita | G06K 9/00248 382/190 |
| 2007/0065045 A1* | 3/2007 | Iwasaki | G06K 9/6203 382/305 |
| 2008/0088698 A1* | 4/2008 | Patel | H04N 7/15 348/14.09 |
| 2008/0219559 A1 | 9/2008 | Koike | G06F 3/0346 382/190 |
| 2009/0024800 A1* | 1/2009 | Flemming | G06F 12/126 711/133 |
| 2009/0232361 A1 | 9/2009 | Miller | |
| 2009/0268024 A1* | 10/2009 | Tsukuda | H04N 21/4223 348/143 |
| 2011/0311112 A1 | 12/2011 | Matsuyama et al. | |
| 2012/0002881 A1* | 1/2012 | Maeda | G06K 9/00677 382/195 |
| 2012/0011496 A1 | 1/2012 | Shimamura | |
| 2012/0159098 A1 | 6/2012 | Cheung | G06F 12/0261 711/162 |
| 2012/0170847 A1 | 7/2012 | Tsukidate | |
| 2013/0298159 A1 | 11/2013 | You et al. | |

FOREIGN PATENT DOCUMENTS

| | | |
|---|---|---|
| JP | 2006-178516 A | 7/2006 |
| JP | 2007-172384 A | 7/2007 |
| JP | 2010-244462 A | 10/2010 |
| JP | 2011-186733 A | 9/2011 |
| JP | 2012-242878 A | 12/2012 |

OTHER PUBLICATIONS

U.S. Office Action for U.S. Appl. No. 16/130,109 dated May 28, 2020.
U.S. Office Action for U.S. Appl. No. 16/130,109 dated Jun. 22, 2021.
U.S. Office Action for U.S. Appl. No. 16/130,061 dated Jun. 22, 2021.
International Search Report for PCT Application No. PCT/JP2013/084305, dated Feb. 25, 2014.
Mikku, "Learn from the Master, DB design, Complete instruction manual", first version, Shoeisha Co., Ltd., Mar. 15, 2012, p. 206-207, Cited in ISR.

* cited by examiner

| FEATURE QUANTITY Fi | SPECIFIC INFORMATION Vi |
|---|---|
| F1 ▭ | 123 — V1 |
| F2 ▭ | 456 — V2 |
| F3 ▭ | 789 — V3 |
| ⋮ | ⋮ |

(b) FEATURE QUANTITY TABLE 110

| FEATURE QUANTITY SFn | ID |
|---|---|
| SF1 ▭ | 001 |
| SF2 ▭ | 002 |
| ⋮ | ⋮ |

(c) RETRIEVAL TABLE 112

| ID | SPECIFIC INFORMATION SVi |
|---|---|
| 001 | 123 — SV1 |
| 002 | 456 — SV2 |
| 001 | 789 — SV3 |
| ⋮ | ⋮ |

Fig.10

| ID | FEATURE QUANTITY SF | SPECIFIC INFORMATION SV |
|---|---|---|
| X | Fx | 12 |
| X | Fa | 34 |
| Y | Fb | 56 |
| ⋮ | ⋮ | ⋮ |

212 RETRIEVAL TABLE

Fig.14

FEATURE QUANTITY TABLE FOR UPDATE 312

| FEATURE QUANTITY SF | ID |
|---|---|
| ▯ | n+1 |
| ▯ | n+2 |
| ... | ... |

RETRIEVAL TABLE 112

| ID | SPECIFIC INFORMATION SV |
|---|---|
| 1 | 123 |
| 2 | 456 |
| 1 | 789 |
| ... | ... |
| n+1 | 1011 |
| n+2 | 1213 |

FEATURE QUANTITY TABLE FOR SAVING 310

| ID | FEATURE QUANTITY SF |
|---|---|
| 1 | ▯ |
| 2 | ▯ |
| ... | ... |
| n | ▯ |

SIMILAR BUT DIFFERENT ID

TF

ID:2 AND ID:n+1 ARE SIMILAR

ID:2 AND n+1 ARE RETRIEVED

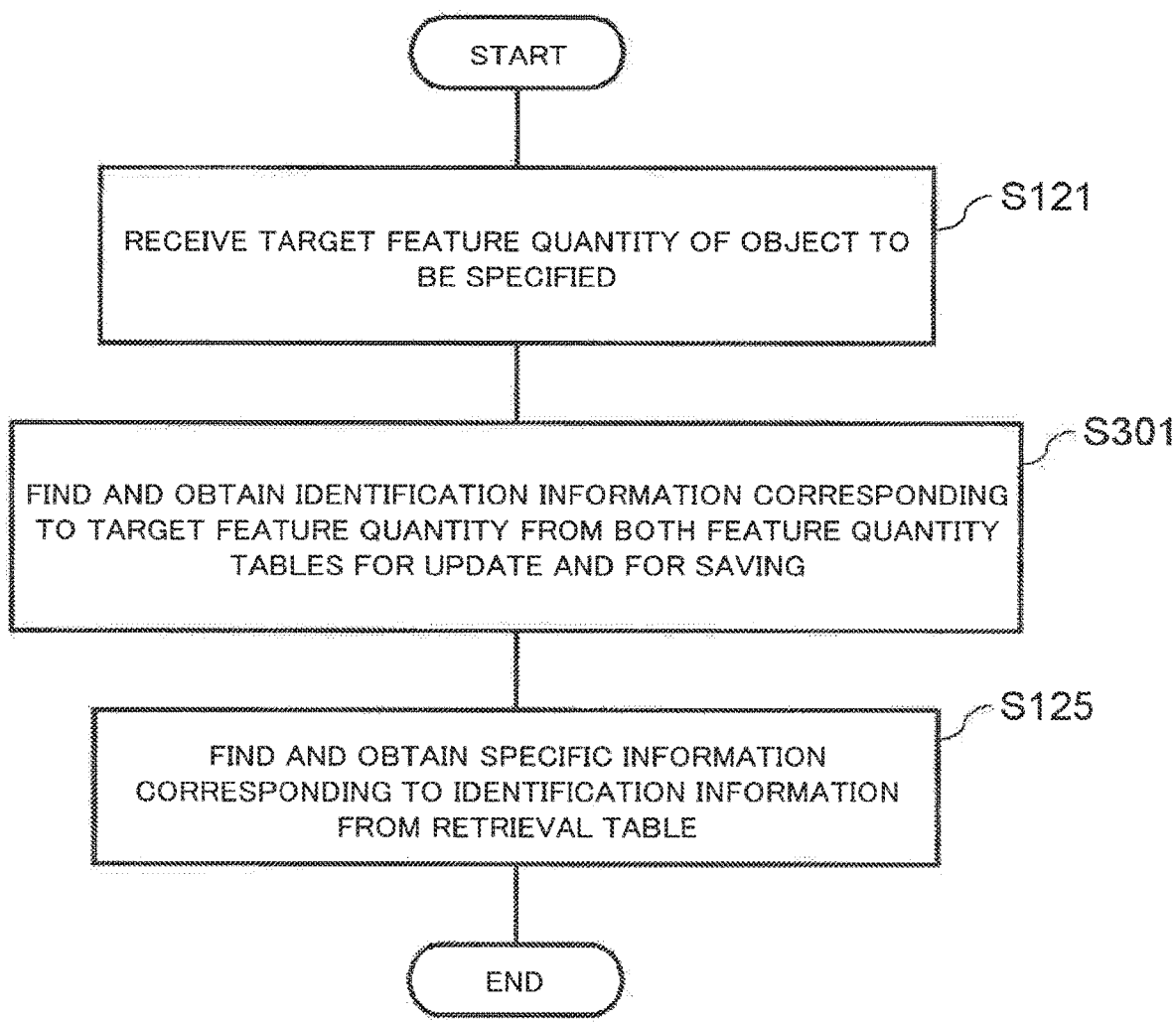

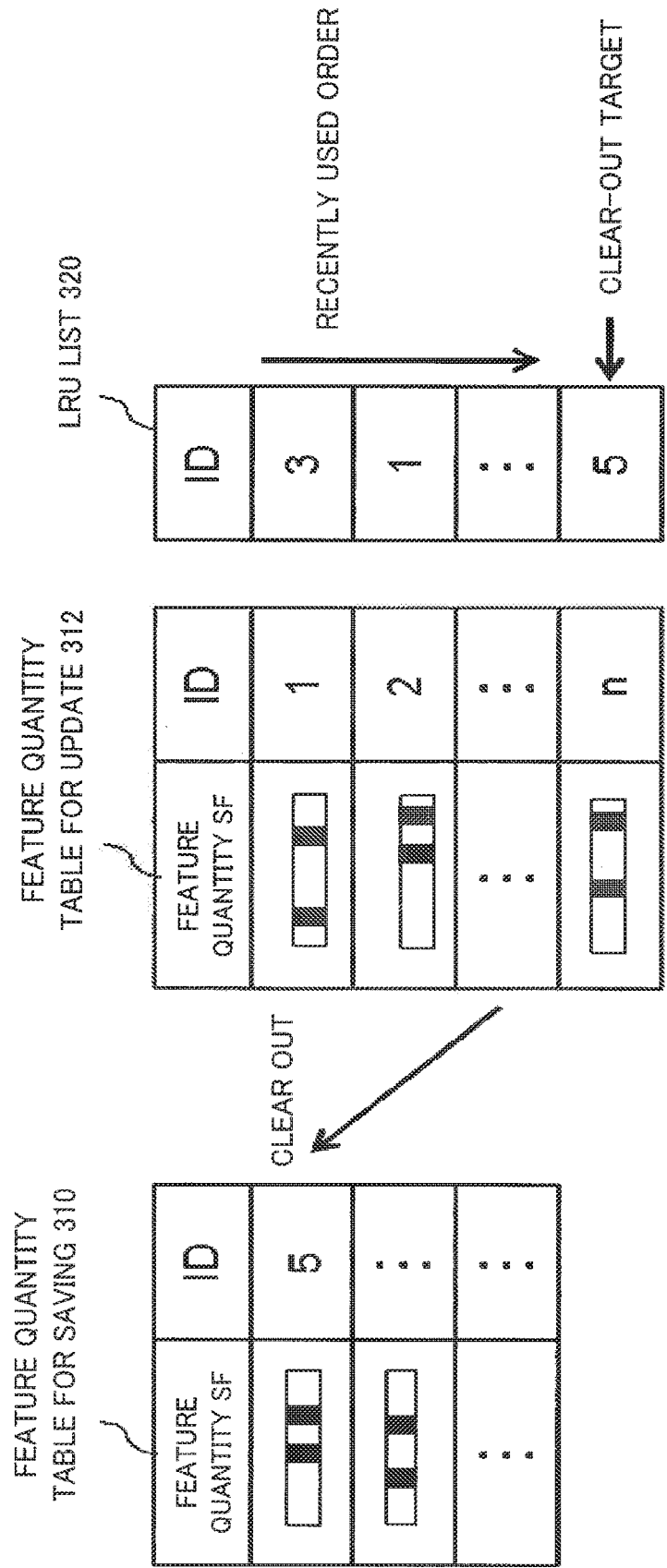

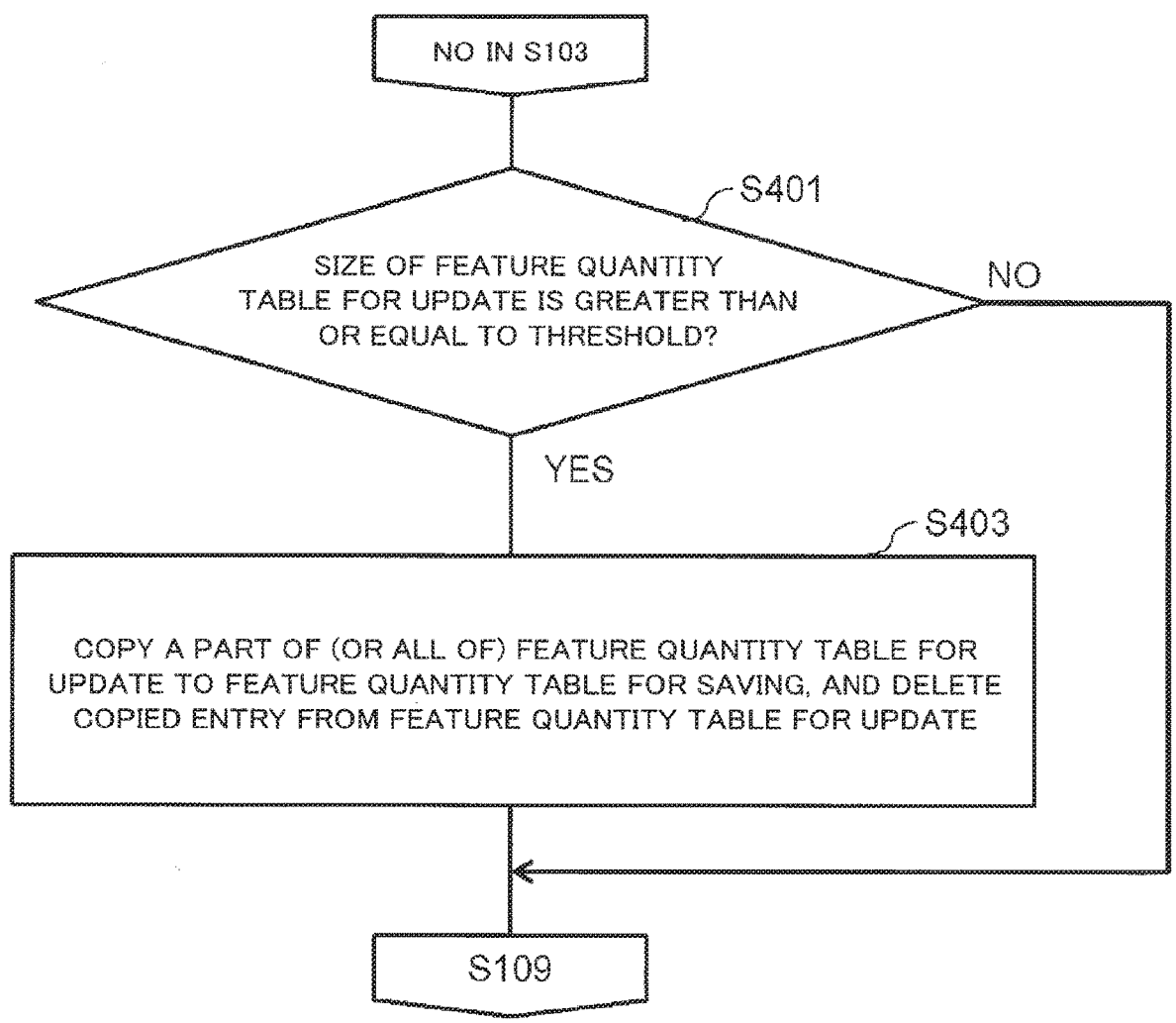

INFORMATION PROCESSING DEVICE, DATA PROCESSING METHOD THEREFOR, AND RECORDING MEDIUM

CROSS-REFERENCE TO RELATED APPLICATIONS

The present application is a continuation application of U.S. patent application Ser. No. 14/769,859 filed on Aug. 24, 2015, which is a National Stage Entry of international application PCT/JP2013/084305, filed Dec. 20, 2013, which claims the benefit of priority from Japanese Patent Application 2013-040645 filed on Mar. 1, 2013, the disclosures of all of which are incorporated in their entirety by reference herein.

TECHNICAL FIELD

The present invention relates to information processing devices, data processing methods therefor, and programs, and in particular to an information processing device that retrieves a similar object, a data processing method therefor, and a program.

BACKGROUND ART

In recent years, a video surveillance system is being widespread which is used for the purpose of preventing crimes and identifying a criminal in a case a crime took place. In the video surveillance system, it is difficult to visually retrieve a target person, and the like, from a large amount of recorded moving image, and thus realization of a mechanical retrieval mechanism is desired.

An example of such system is described in PTL 1. In the system described in PTL 1, a "feature quantity" extracted from a face, a color, and the like in the image is used. The feature quantity is a multi-dimensional vector, and a similarity between the feature quantities can be calculated through a method described in PTL 2, and the like.

In the system described in the above-described literature, the feature quantity is extracted from each frame image of the moving image of the surveillance camera, and then saved in a database. When retrieving from the moving image of the surveillance camera, the feature quantity is extracted from the image including the content desired to be retrieved. The similarity between such feature quantity and the feature quantity in the database is calculated, and the image corresponding to the feature quantity having the highest similarity is outputted to allow the retrieval of the moving image.

It is an expensive process to search for the feature quantity having the highest similarity with the feature quantity desired which is retrieved from a large amount of feature quantity in the database. In PTL 1, the cost of retrieval is reduced by degenerating the dimensions of the vector of the feature quantity, and carrying out the process which is approximate to a low dimension.

An image retrieving device described in PTL 3 is a device that retrieves a similar image, and when a face is detected from the video, the device computes a feature quantity of the detected face image and stores the computed feature quantity in an image feature quantity storage unit with a registration ID, a camera ID, a time, a reduced image data, and an image storage location. PTL 3 describes using the image feature quantity stored in the image feature quantity storage unit to retrieve a similar image, and then determining that the similarity is high when the similarity is greater than or equal to a predetermined threshold value. The registration ID or the image ID of the image determined to have high similarity is also temporarily stored with the similarity.

CITATION LIST

Patent Literature

PTL 1: Japanese Laid-Open Patent Publication No. 2007-172384
PTL 2: Japanese Laid-Open Patent Publication No. 2002-183205
PTL 3: Japanese Laid-Open Patent Publication No. 2011-186733

SUMMARY OF INVENTION

Technical Problem

The system described above has problems in accuracy such as occurrence of retrieval leakage since the dimensions of the vector of the feature quantity is degenerated. In a case the approximation is not used, all of the similarity calculations between the large amount of feature quantity in the database and the feature quantity of the retrieving image need to be carried out, which leads to increase in cost.

It is an object of the present invention to provide an information processing device, a data processing method therefor, and a program that overcome high cost and lowering in accuracy, which are the problems mentioned above.

Solution to Problem

An information processing device according to an exemplary aspect of the present invention includes:

a feature quantity obtaining unit that obtains a feature quantity of an object to be extracted, which is extracted from a retrieval target, and specific information that is capable of specifying an appearing location of the feature quantity in the retrieval target;

a feature quantity holding unit that, when storing the feature quantity in a feature quantity table which holds the feature quantity obtained by the feature quantity obtaining unit with identification information added thereto, references the feature quantity table, adds new identification information to the feature quantity and holds the feature quantity in the feature quantity table when a similar feature quantity in which a similarity with the feature quantity is greater than or equal to a first similarity is not held in the feature quantity table, and outputs identification information which is the same as the similar feature quantity as identification information of the feature quantity when the similar feature quantity is held in the feature quantity table; and a retrieval table holding unit that holds the specific information obtained by the feature quantity obtaining unit as a retrieval table in association with the identification information added by or the identification information outputted by the feature quantity holding unit for the feature quantity.

A data processing method of an information processing device according to an exemplary aspect of the present invention, the information processing device, obtains a feature quantity of an object to be extracted, which is extracted from a retrieval target, and specific information that is capable of specifying an appearing location of the feature quantity in the retrieval target;

when storing the feature quantity in a feature quantity table which holds the obtained feature quantity with identification information added thereto, references the feature quantity table, adds new identification information to the feature quantity and holds the feature quantity in the feature quantity table when a similar feature quantity in which a similarity with the feature quantity is greater than or equal to a threshold is not held in the feature quantity table, and outputs identification information which is the same as the similar feature quantity as identification information of the feature quantity when the similar feature quantity is held in the feature quantity table; and holds the obtained specific information as a retrieval table in association with the identification information added or outputted for the feature quantity.

A program according to an exemplary aspect of the present invention, causes a computer to execute procedures of:

obtaining a feature quantity of an object to be extracted, which is extracted from a retrieval target, and specific information that is capable of specifying an appearing location of the feature quantity in the retrieval target;

when storing the feature quantity in a feature quantity table which holds the obtained feature quantity with identification information added thereto, referencing the feature quantity table, adding new identification information to the feature quantity and holding the feature quantity in the feature quantity table when a similar feature quantity, in which a similarity with the feature quantity is greater than or equal to a threshold, is not held in the feature quantity table, and outputting identification information which is the same as the similar feature quantity as identification information of the feature quantity when the similar feature quantity is held in the feature quantity table; and holding the obtained specific information as a retrieval table in association with the identification information added or outputted for the feature quantity.

Arbitrary combinations of the above configuring elements, as well as the representations of the present invention converted among methods, devices, systems, recording media, computer programs, and the like are also effective as aspects of the present invention.

The various types of configuring elements of the present invention do not necessarily need to individually and independently exist, and, for example, a plurality of configuring elements may be formed as one member, one configuring element may be formed with a plurality of members, a certain configuring element may be a part of another configuring element, a part of a certain configuring element and a part of another configuring element may be overlapped.

Furthermore, a plurality of procedures are described in order in the data processing method and the computer program of the present invention, but such described order does not restrict the order of executing the plurality of procedures. Thus, when performing the data processing method and the computer program of the present invention, the order of the plurality of procedures can be modified within a scope in which problems do not arise in terms of content.

Moreover, the plurality of procedures of the data processing method and the computer program of the present invention are not limited to be executed at timing different from each other. Thus, for example, a certain procedure may occur during the execution of another procedure, the execution timing of a certain procedure and the execution timing of another procedure may partially or entirely overlap.

Advantageous Effects of Invention

According to the present invention, the information processing device, the data processing method therefor, and the program capable of efficiently retrieving a similar feature quantity while reducing cost and without lowering the accuracy are provided.

BRIEF DESCRIPTION OF DRAWINGS

The above-described objects as well as other objects, characteristics, and advantages should become more apparent from the preferred exemplary embodiments described below and the drawings accompanying such descriptions.

FIG. 3 is a diagram illustrating one example of a structure of data to be obtained, and a feature quantity table and a retrieval table to be accessed by the information processing device according to the exemplary embodiment of the present invention.

FIG. 10 is a diagram illustrating one example of a structure of a retrieval table according to the exemplary embodiment of the present invention.

FIG. 14 is a diagram describing a feature quantity table of the information processing device according to the exemplary embodiment of the present invention.

FIG. 15 is a flowchart illustrating one example of the operation at the time of retrieval of the information processing device according to the exemplary embodiment of the present invention.

FIG. 16 is a diagram describing a feature quantity table and an LRU list of the information processing device according to the exemplary embodiment of the present invention.

FIG. 17 is a flowchart illustrating one example of an operation of the information processing device according to the exemplary embodiment of the present invention.

DESCRIPTION OF EMBODIMENTS

Figure 1:
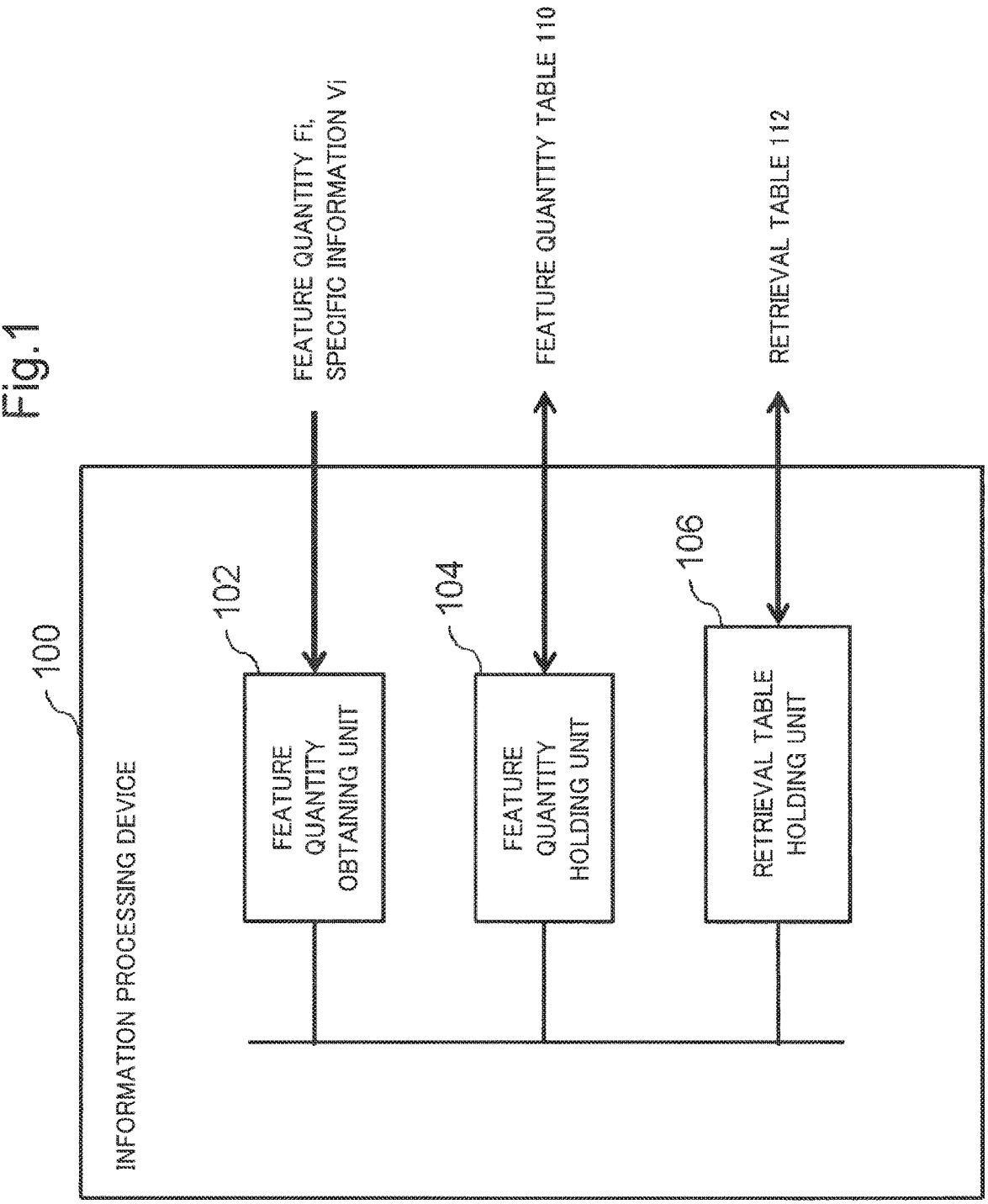
FIG. 1 is a function block diagram illustrating a logical configuration of an information processing device according to an exemplary embodiment of the present invention.

Exemplary embodiments of the present invention will be hereinafter described using the drawings. Throughout the figures, similar reference numerals are denoted on similar configuring elements and the description thereof will be appropriately omitted.

First Exemplary Embodiment

FIG. 1 is a function block diagram illustrating a logical configuration of an information processing device 100 according to an exemplary embodiment of the present invention.

The information processing device 100 according to the exemplary embodiment of the present invention includes a feature quantity obtaining unit 102 that obtains a feature quantity Fi of an object to be extracted, which is extracted from a retrieval target, and specific information Vi that can specify an appearing location of the feature quantity Fi in the retrieval target; a feature quantity holding unit 104 that, when storing the feature quantity Fi in a feature quantity table 110 which holds the feature quantity Fi obtained by the feature quantity obtaining unit 102 with identification information IDm added thereto, references a feature quantity table 110, adds new identification information IDm to the feature quantity Fi and holds the feature quantity Fi in the feature quantity table 110 if a similar feature quantity SFn, in which the similarity with the feature quantity Fi is greater than or equal to a threshold, is not held in the feature quantity table 110, and outputs identification information IDn which is the same as the similar feature quantity SFn as the identification information of the feature quantity Fi if the similar feature quantity SFn is held in the feature quantity table 110; and a retrieval table holding unit 106 that associates the specific information Vi obtained by the feature quantity obtaining unit 102 with the identification information IDm added by or the identification information IDn outputted by the feature quantity holding unit 104 for the feature quantity Fi and holds the same as a retrieval table 112.

Here, i, n, and m are natural numbers.

In the information processing device 100 of the present exemplary embodiment, the retrieval target is, for example, a video of a surveillance camera, and the object to be extracted is, for example, an image, particularly a face image of a person recorded in a moving image data of such video. The information processing device 100 of the present exemplary embodiment carries out, for example, a similarity retrieval which targets a feature quantity created from the video of the surveillance camera, and the like.

The property of input data is given attention in the present invention. For example, in the case of the video of the surveillance camera, often times the same person may appear in a different frame of the same camera or may appear in a different camera. In this case, the similarity between the feature quantities extracted from the videos of the different cameras corresponding to the same person is high. Actually, when retrieving the video of the surveillance camera, the feature quantity is extracted from the image including the person desired to be retrieved, and the feature quantity having a high similarity with such feature quantity is retrieved from the database.

The information processing device 100 of the present exemplary embodiment carries out a process of registering the information of the video of the surveillance camera in the database which is used for such retrieval.

Figure 2:
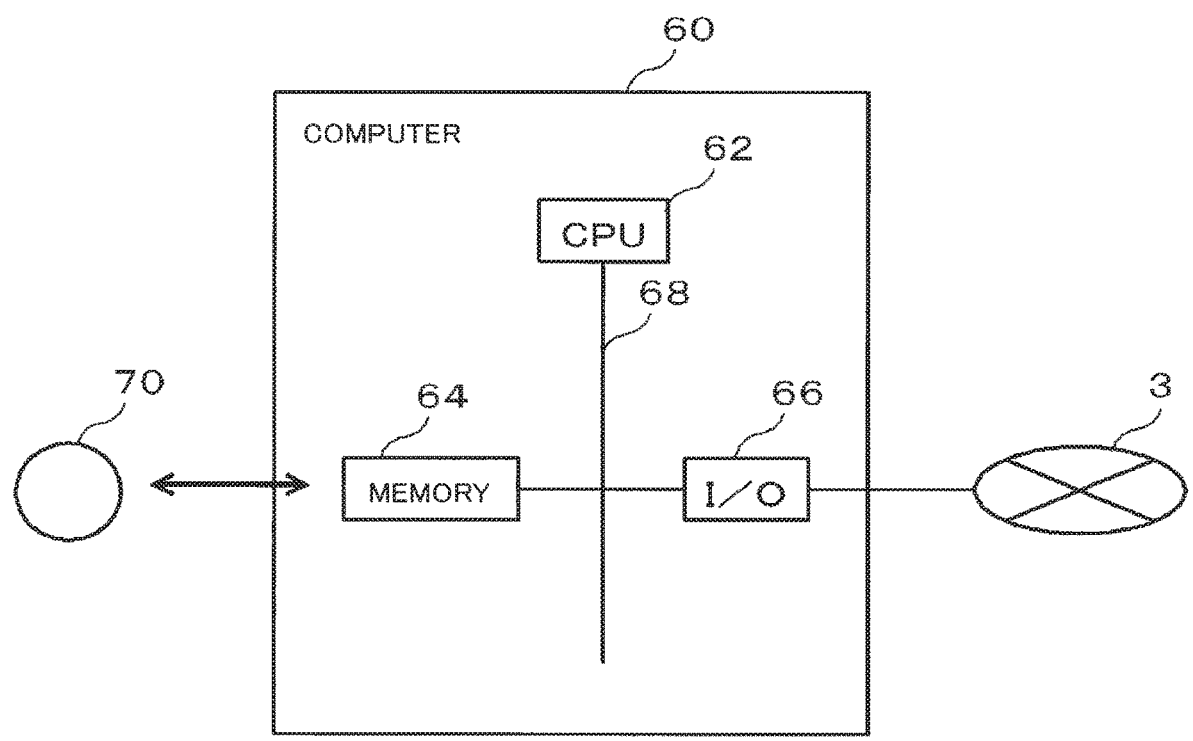
FIG. 2 is a block diagram illustrating a hardware configuration of a computer configuring the information processing device according to the exemplary embodiment of the present invention.

FIG. 2 is a block diagram illustrating a hardware configuration of a computer 60 configuring the information processing device 100 according to the exemplary embodiment of the present invention.

The computer 60 of the present exemplary embodiment can be realized with a server computer and a personal computer, or an equivalent device thereto. The computer 60 may also be configured by a virtual server, and the like. In each figure, the configuration of a portion that is not related to the essence of the present invention is omitted and is also not illustrated.

Each configuring element of the information processing device 100 of the present exemplary embodiment is realized by an arbitrary combination of hardware and software of an arbitrary computer 60 including a CPU 62, a program loaded in a memory 64 for realizing the configuring elements in the figure, a storage unit (not shown) for storing the program, and an I/O (Input/Output) 66 including a connection interface of a network 3. The CPU 62 is connected to each element of the computer 60 by way of a bus 68, and controls the entire computer 60 with each element. It should be recognized by those skilled in the art that the realization method and device include various variants. Each function block diagram described below does not show the configuration in units of hardware, but blocks in units of logical functions.

The computer 60 can also be connected to an input/output device (not shown) by way of the I/O 66, and may also have a user interface function, and the like.

In the information processing device 100 of the present exemplary embodiment, various types of units as described above are realized as various types of functions when the CPU 62 of the computer 60 executes the various types of processing operations corresponding to the computer program.

The computer program of the present exemplary embodiment is described to cause the computer 60 for realizing the information processing device 100 to execute the procedures of obtaining the feature quantity Fi of the object to be extracted, which is extracted from a retrieval target, and the specific information Vi that can specify an appearing location of the feature quantity Fi in the retrieval target; when storing a feature quantity in the feature quantity table 110, which holds the obtained feature quantity Fi with the identification information IDm added thereto, referencing the feature quantity table 110, adding new identification information IDm to the feature quantity Fi and holding the feature quantity Fi in the feature quantity table 110 if the similar feature quantity SFn, in which the similarity with the feature quantity Fi is greater than or equal to a threshold, is not held in the feature quantity table 110, and outputting identification information IDn which is the same as the similar feature quantity SFn as the identification information of the feature quantity Fi if the similar feature quantity SFn is held in the feature quantity table 110; and associating the obtained specific information Vi with the added identification information IDm or the outputted identification information IDn for the feature quantity Fi and holding the specific information Vi as the retrieval table 112.

A computer program 70 of the present exemplary embodiment may be recorded in a recording medium (not shown) which is readable with the computer 60. The recording medium is not particularly limited, and may take various forms. The program 70 may be loaded from the recording medium to the memory 64 of the computer 60, or may be downloaded to the computer 60 through the network 3 and loaded in the memory 64.

As illustrated in FIG. 1, in the information processing device 100 of the present exemplary embodiment, the feature quantity obtaining unit 102 obtains the feature quantity Fi of the object to be extracted, which is extracted from the retrieval target, and the specific information Vi that can specify the appearing location of the feature quantity Fi in the retrieval target.

For example, the feature quantity obtaining unit 102 obtains the feature quantity Fi of the face image of a person detected from the video of the surveillance camera through image analyzing process, and the like. The specific information Vi is not particularly limited as long as it is information that can specify the appearing location of the image detected in the moving image data of the video. For example, the specific information Vi may be any one of a frame number, a camera ID, a photographed location, a photographed date and time, and a video recording medium ID, and the like of the moving image data, or a combination thereof.

In the present exemplary embodiment, if one scene (one frame) in the moving image data of the video includes a plurality of people, the feature quantity Fi of the face image of the plurality of people corresponded with the specific information Vi can be obtained.

When the detecting target is the video of the surveillance camera, for example, the retrieval target is assumed to be recorded in the storage device, the recording medium, or the like in a mode in which the video can be checked from the specific information Vi abovementioned. A device for carrying out the image analyzing process on the moving image data of the video is not particularly limited. The timing of the image analyzing process is also not particularly limited, and for example, the image analyzing process may be sequentially carried out as the surveillance camera is photographing while video recording, or may be carried out at an arbitrary timing for the recorded video.

In the present invention, the retrieval target is the moving image data of the video of the surveillance camera, but is not limited thereto, and arbitrary data can be used as long as it is data that can determine the similarity. The moving image data is not the sole case, and still image data, for example, a medical diagnosis image, and the like, or recorded audio data, and the like may be adopted.

The feature quantity holding unit 104 references the feature quantity table 110 and computes the similarity between the feature quantity Fi and the feature quantity SFn which is held in the feature quantity table 110 before storing the feature quantity Fi in the feature quantity table 110. The feature quantity holding unit 104 determines that the feature quantity SFn in which the similarity with the feature quantity Fi is greater than or equal to the threshold is similar.

If the similar feature quantity SFn is not held in the feature quantity table 110, the feature quantity holding unit 104 adds the new identification information IDm to the feature quantity Fi and holds the same in the feature quantity table 110.

If the similar feature quantity SFn in which the similarity with the feature quantity Fi is greater than or equal to the threshold is held in the feature quantity table 110, the feature quantity holding unit 104 outputs the identification information IDn which is the same as the similar feature quantity SFn to the retrieval table holding unit 106 as the identification information which is given to the feature quantity Fi. In the present exemplary embodiment, the feature quantity Fi obtained by the feature quantity obtaining unit 102 can be discarded without being held in the feature quantity table 110.

The similarity is determined when registering the feature quantity in the feature quantity table 110 in the present exemplary embodiment, but the similarity is also used when retrieving the target feature quantity using the feature quantity table 110. The threshold of similarity used at the time of registration and the threshold of similarity used at the time of retrieval may be the same or may be different. In the present invention, the threshold used for the similarity determination at the time of registration is referred to as a first threshold (or a first similarity) and the threshold used for the similarity determination at the time of retrieval is referred to as a second threshold (or a second similarity). In particular, if distinction does not need to be made, such thresholds are simply referred to as a threshold (or a similarity).

The retrieval table holding unit 106 correlates the specific information Vi obtained by the feature quantity obtaining unit 102 with the identification information IDm added by or the identification information IDn outputted by the feature quantity holding unit 104 for the feature quantity Fi, and holds the same in the retrieval table 112.

The feature quantity table 110 and the retrieval table 112 of the present exemplary embodiment will now be described using FIG. 3.

First, as illustrated in (a) of FIG. 3, the feature quantity obtaining unit 102 of the present exemplary embodiment obtains the feature quantity Fi and the specific information Vi. In (a) of FIG. 3, a state in which data sets such as (F1, V1), (F2, V2), (F3, V3), . . . , etc. are sequentially obtained by the feature quantity obtaining unit 102 is illustrated.

As illustrated in (b) of FIG. 3, the feature quantity table 110 holds the feature quantity Fi obtained by the feature quantity obtaining unit 102 with the identification information ID added thereto. In (b) of FIG. 3, the feature quantity saved in the feature quantity table 110 is indicated as "SFn".

The identification information ID can be, for example, information generated by combining an arbitrary number, symbol, character, and the like. In the present embodiment, the identification information ID is a three-digit number. In (b) of FIG. 3, a state in which (SF1, ID: 001), (SF2, ID: 002), . . . , etc. are saved in the feature quantity table 110 is illustrated.

As illustrated in (c) of FIG. 3, the retrieval table 112 associates the specific information Vi of the feature quantity Fi obtained by the feature quantity obtaining unit 102 with the identification information IDm added by or the identification information IDn outputted by the feature quantity holding unit 104, and holds the same for each feature quantity Fi obtained by the feature quantity obtaining unit 102. In (c) of FIG. 3, the specific information saved in the retrieval table 112 is indicated as "SVi". In (c) of FIG. 3, a state in which (ID: 001, SV1), (ID: 002, SV2), (ID: 001, SV3), . . . , etc. are saved in the retrieval table 112 is illustrated.

In (c) of FIG. 3, a value of a frame number of the moving image data of the video is associated with the identification information ID as the specific information SVi.

In the retrieval table 112 illustrated in (c) of FIG. 3, two records are registered with the specific information SV1 and SV3 correlated with the identification information ID: 001. In this example, it is apparent that the same identification information ID: 001 is given to two different specific information SVi of V1:123, which is in pair with F1, and V3: 789, which is in pair with F3, since the feature quantities F1 and F3 are similar, and saved in the retrieval table 112.

The information processing device 100 of the present exemplary embodiment is accessibly connected to the storage device that stores the feature quantity table 110 and the retrieval table 112. Alternatively, the information processing device 100 may store the feature quantity table 110 and the retrieval table 112 in the memory 64 of the computer 60 configuring the information processing device 100.

In the present exemplary embodiment, rather than associating and holding all the feature quantities Fi and the specific information Vi obtained by the feature quantity obtaining unit 102 as they are, the feature quantity Fi is registered in the feature quantity table 110 with the identification information ID given thereto, and the specific information Vi is registered in the retrieval table 112 with the identification information ID associated therewith. In this case, the feature quantity holding unit 104 checks whether or not the feature quantity SFn having a similarity which is greater than or equal to the threshold is saved in the feature quantity table 110. If not saved, the feature quantity holding unit 104 assigns new identification information IDm to the feature quantity Fi, and then saves the feature quantity Fi in the feature quantity table 110. If saved, the feature quantity holding unit 104 obtains the identification information IDn correlated with the relevant feature quantity SFn. The newly assigned IDm or the obtained IDn and the provided specific information Vi are then correlated, and saved in the retrieval table 112 by the retrieval table holding unit 106.

In the configuration described above, the data processing method by the information processing device 100 of the present exemplary embodiment will be described below.

Figure 4:
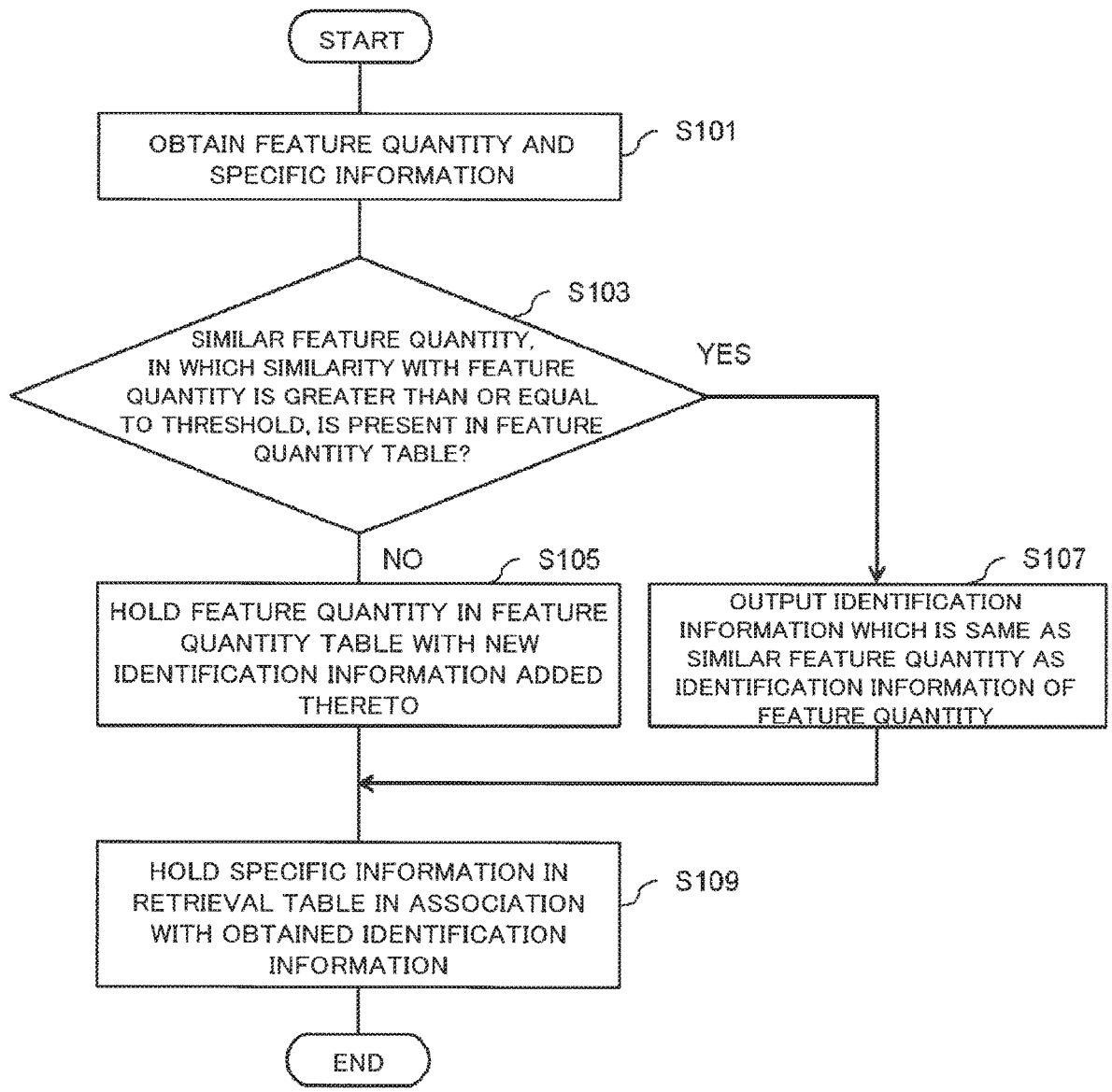
FIG. 4 is a flowchart illustrating one example of an operation of the information processing device according to the exemplary embodiment of the present invention.

FIG. 4 is a flowchart illustrating one example of the operation of the information processing device 100 according to the exemplary embodiment of the present invention.

In the data processing method of the present exemplary embodiment includes, the information processing device 100 obtains the feature quantity Fi of the object to be extracted, which is extracted from the retrieval target, and the specific information Vi that can specify the appearing location of the feature quantity Fi in the retrieval target (step S101). When storing the feature quantity Fi in the feature quantity table 110, which holds the obtained feature quantity Fi with the identification information IDm added thereto, the information processing device 100 references the feature quantity table 110. The information processing device 100 adds new identification information IDm to the feature quantity Fi and holds the feature quantity Fi in the feature quantity table 110 (step S105) if the similar feature quantity SFn, in which the similarity with the feature quantity Fi is greater than or equal to a threshold, is not held in the feature quantity table 110 (NO in step S103). The information processing device 100 outputs the identification information IDn which is the same as the similar feature quantity SFn as the identification information of the feature quantity Fi (step S107) if the similar feature quantity SFn is held in the feature quantity table 110 (YES in step S103). Then, the information processing device 100 associates the obtained specific information Vi with the identification information IDm added for or the identification information IDn outputted for the feature quantity Fi and holds the specific information Vi as the retrieval table 112 (step S109).

Specifically, the feature quantity obtaining unit 102 first obtains the feature quantity Fi and the specific information Vi (step S101). The feature quantity obtaining unit 102 then provides the feature quantity Fi to the feature quantity holding unit 104, and the specific information Vi to the retrieval table holding unit 106. The feature quantity holding unit 104 references the feature quantity table 110, and compares the feature quantity Fi received from the feature quantity obtaining unit 102 with the feature quantity SFn in the feature quantity table 110. In this case, the feature quantity holding unit 104 computes the similarities between the feature quantity Fi and each feature quantity SFn in the feature quantity table 110 respectively. The feature quantity holding unit 104 then examines whether or not the feature quantity SFn, in which the similarity is greater than or equal to the threshold, is present in the feature quantity table 110 (step S103).

If the feature quantity SFn, in which the similarity is greater than or equal to the threshold, is not present as a result of the comparison (NO in step S103), the feature quantity holding unit 104 adds the new identification information IDm to the feature quantity Fi and adds the feature quantity Fi to the feature quantity table 110 in correlation (step S105).

If the feature quantity SFn, in which the similarity is greater than or equal to the threshold, is present (YES in step S103), the feature quantity holding unit 104 outputs the identification information IDn which is the same as the similar feature quantity SFn as the identification information of the feature quantity Fi (step S107). In this case, the feature quantity holding unit 104 does not save the feature quantity Fi received from the feature quantity obtaining unit 102 in the feature quantity table 110.

The retrieval table holding unit 106 then correlates the identification information IDm which is newly added to the feature quantity Fi in step S105 or the identification information IDn which is outputted in step S107 with the specific information Vi of the feature quantity Fi received from the feature quantity obtaining unit 102, and holds the same in the retrieval table 112 (step S109).

The processes in FIG. 4 are repeatedly executed each time the feature quantity obtaining unit 102 obtains the feature quantity Fi and the specific information Vi in step S101. The information are additionally registered and accumulated in the feature quantity table 110 and the retrieval table 112. The feature quantity table 110 and the retrieval table 112 generated in such manner can be used as a database at the time of retrieval, which is described later.

In this case, if the pair of feature quantity Fi and the specific information Vi (frame number) is saved in the feature quantity table 110 for every frame, the size of the feature quantity table 110 becomes enormous. Furthermore, the load becomes high and the cost also becomes high since the similarity with all the feature quantities need to be calculated at the time of retrieval described later.

According to the information processing device 100 of the present exemplary embodiment, however, the number of feature quantities which is saved in the feature quantity table 110 can be reduced by operating in a manner described above. At the time of retrieval described later, the similarity is calculated and compared only for the feature quantity saved in the feature quantity table 110, hence the load can be suppressed and the retrieval can be efficiently carried out.

As described above, according to the information processing device 100 of the present exemplary embodiment, the similar feature quantity can be efficiently retrieved without lowering the accuracy while reducing the cost. The reason therefor is that the possibility of occurrence of retrieval leakage is low as the dimensions of the vector of the feature quantity are not degenerated, and the approximation process and the like at the low dimension are not carried out. Furthermore, the reason also lies in that the number of feature quantities, for which the similarity is to be calculated, can be reduced by assigning the same identification information for the similar feature quantity at the time of saving the feature quantity.

Moreover, the system described in the above-described patent literature had a problem in that the feature quantity to be saved in the database becomes a large amount. This is because in the system described in the above-described patent literature, for the feature quantity in which the similarity is determined as high by approximation, the correct similarity is re-calculated using the actual feature quantity, and thus the original feature quantity needs to be saved.

According to the information processing device 100 of the exemplary embodiment of the present invention, an effect that the similar feature quantity can be retrieved without saving a large amount of feature quantities can be obtained. Thus, the capacity for holding the feature quantity can be reduced. The reason therefor is that the similar feature quantity is not saved, and only one original feature quantity is saved.

Second Exemplary Embodiment

Figure 5:
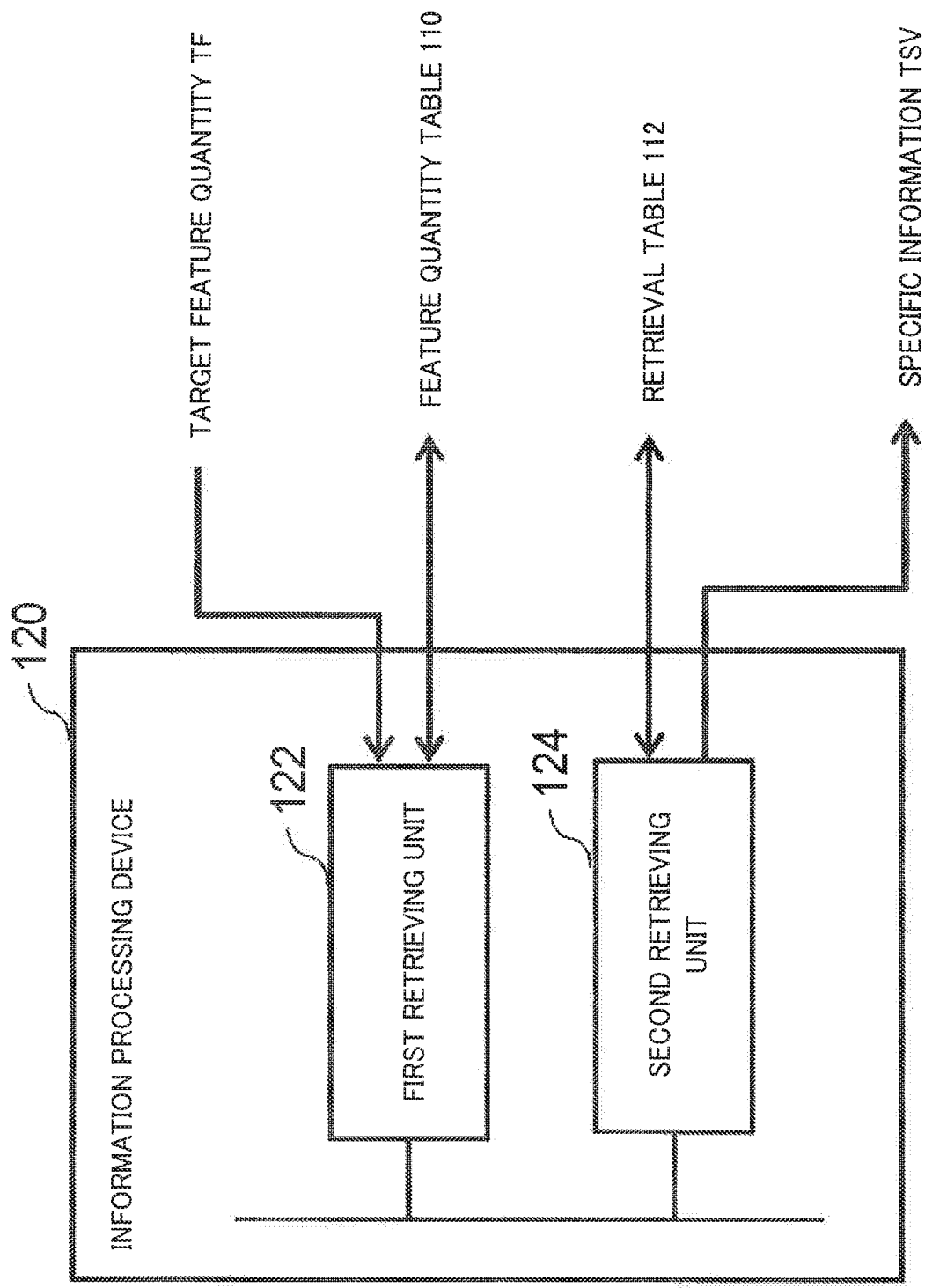
FIG. 5 is a function block diagram illustrating a logical configuration of an information processing device according to an exemplary embodiment of the present invention.

FIG. 5 is a function block diagram illustrating a logical configuration of an information processing device 120 according to the exemplary embodiment of the present invention.

The information processing device 120 of the present exemplary embodiment differs from that in the exemplary embodiment described above in that a configuration of retrieving an object to be specified using the feature quantity table 110 and the retrieval table 112 prepared in the information processing device 100 of the exemplary embodiment described above is provided. The information processing device 120 of the present exemplary embodiment may include the configuration of the information processing device 100 of the above-described exemplary embodiment of FIG. 1 or may be integrated with the information processing device 100.

The information processing device 120 of the present exemplary embodiment includes a first retrieving unit 122 that receives a target feature quantity TF of the object to be specified, references the feature quantity table 110, retrieves the feature quantity in which the similarity with the target feature quantity TF is greater than or equal to the threshold in the feature quantity table 110, and obtains the identification information corresponding to the found feature quantity from the feature quantity table 110. And, the information processing device 120 includes a second retrieving unit 124 that references the retrieval table 112, retrieves the identification information ID obtained by the first retrieving unit 122 in the retrieval table 112, and obtains specific information TSV corresponding to the found identification information from the retrieval table 112.

Similar to the information processing device 100, each configuring element of the information processing device 120 is realized by an arbitrary combination of hardware and software of the computer 60 (FIG. 2).

In the information processing device 120 of the present exemplary embodiment, various types of processing operations corresponding to the computer program are executed by the CPU 62 of the computer 60, so that various types of units described above are realized as various types of functions.

The computer program of the present exemplary embodiment is described to cause the computer 60 for realizing the information processing device 120 to execute the procedure of receiving the target feature quantity TF of the object to be specified, referencing the feature quantity table 110, retrieving the feature quantity in which the similarity with the target feature quantity TF is greater than or equal to the threshold in the feature quantity table 110, and obtaining the identification corresponding to the found feature quantity from the feature quantity table 110; and the procedure of referencing the retrieval table 112, retrieving the obtained identification information in the retrieval table 112, and obtaining the specific information corresponding to the found identification information from the retrieval table 112.

The target feature quantity TF of the present exemplary embodiment is, for example, the feature quantity of the face image, and the like of a person to become the target desired to be searched from the video. For example, the target feature quantity TF is the feature quantity obtained by performing the image analyzing process on the face image of the person.

A receiving means of the target feature quantity is not particularly limited. For example, the target feature quantity may be received from other devices via a communication means, or may be read out from the recording medium or the storage device.

The information processing device 120 of the present exemplary embodiment is accessibly connected to the storage device for storing the feature quantity table 110 and the retrieval table 112. Alternatively, the information processing device 120 may store the feature quantity table 110 and the retrieval table 112 in the memory 64 of the computer 60 configuring the information processing device 120.

The first retrieving unit 122 computes the similarities between the target feature quantity TF which is retrieval target and each feature quantity held in the feature quantity table 110 respectively, and retrieves the feature quantity in which the computed similarity is greater than or equal to the threshold from the feature quantity table 110. The first retrieving unit 122 obtains the identification information correlated with the found feature quantity from the feature quantity table 110, and provides such identification information to the second retrieving unit 124.

The threshold used for the similarity determination may be a value which is different from the threshold used when the feature quantity holding unit 104 of the above-described exemplary embodiment registers the feature quantity in the feature quantity table 110. As described above, the threshold which is used when the information processing device 100 of the above-described exemplary embodiment registers the feature quantity in the feature quantity table 110 is referred to as a first threshold (or a first similarity), and the threshold which is used when the information processing device 120 of the present exemplary embodiment retrieves the feature quantity from the feature quantity table 110 is referred to as a second threshold (or a second similarity). In particular, if any distinction does not need to be made, such thresholds are simply referred to as a threshold (or a similarity).

The second retrieving unit 124 references the retrieval table 112, obtains the specific information TSV, which is correlated with the identification information received from the first retrieving unit 122, from the retrieval table 112, and outputs the same as a retrieval result.

The specific information TSV may be outputted in plurals with respect to the target feature quantity TF.

An output means of the specific information is not particularly limited. For example, the specific information may be transmitted to other devices via the communication means, stored in the recording medium or the storage device, print outputted on a paper medium, or displayed on a monitor.

For example, the video may be retrieved from the frame number, which is the specific information TSV, based on the retrieval result obtained in the above manner, so that the target image can be checked.

In the configuration described above, the data processing method by the information processing device 120 of the present exemplary embodiment will be described below.

Figure 6:
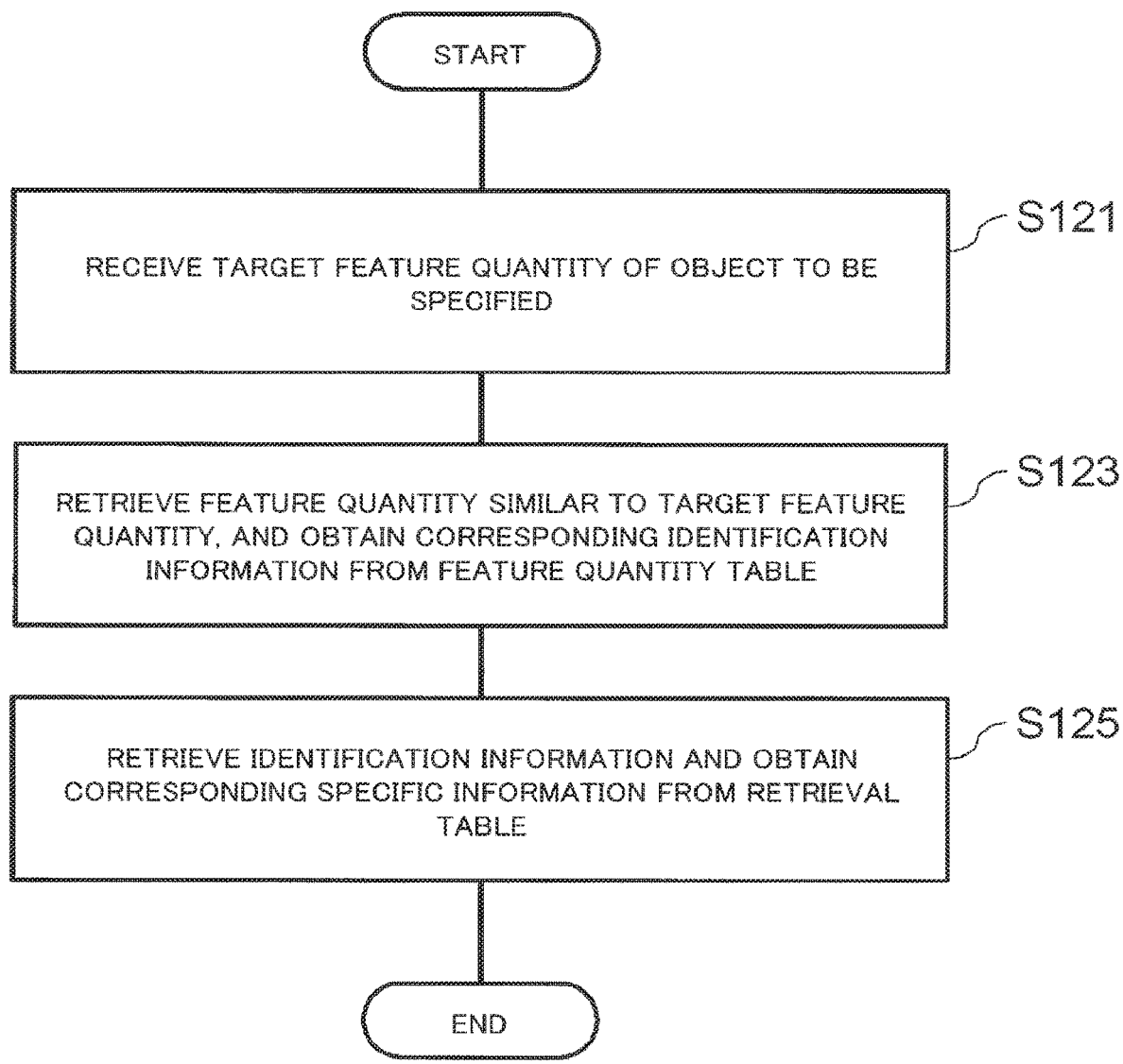
FIG. 6 is a flowchart illustrating one example of an operation of the information processing device according to the exemplary embodiment of the present invention.

FIG. 6 is a flowchart illustrating one example of the operation of the information processing device 120 according to the exemplary embodiment of the present invention.

In the data processing method of the present exemplary embodiment, the information processing device 120 receives the target feature quantity TF of the object to be specified (step S121), references the feature quantity table 110, retrieves the feature quantity in which the similarity with the target feature quantity TF is greater than or equal to the threshold in the feature quantity table 110, and obtains the identification information corresponding to the found feature quantity from the feature quantity table 110 (step S123), references the retrieval table 112, retrieves the obtained identification information ID in the retrieval table 112, and obtains the specific information corresponding to the found identification information from the retrieval table 112 (step S125).

More specifically, in the present exemplary embodiment, the first retrieving unit 122 first receives the feature quantity obtained through image analysis from an image of an object to be specified, for example, a person of a retrieval target as the target feature quantity TF to be specified (step S121). The first retrieving unit 122 then computes the similarity between the target feature quantity TF and each feature quantity in the feature quantity table 110. The first retrieving unit 122 also retrieves the feature quantity in which the computed similarity is greater than or equal to the second threshold from the feature quantity table 110, and obtains the identification information ID correlated with the found feature quantity (step S123). In this case, the first retrieving unit 122 may obtain a plurality of identification information IDs. The first retrieving unit 122 provides the obtained identification information ID to the second retrieving unit 124.

The second retrieving unit 124 retrieves the identification information which is received from the first retrieving unit 122 from the retrieval table 112, and obtains the specific information SV correlated with the found identification information ID (step S125). The second retrieving unit 124 then outputs the specific information SV as the retrieval result (TSV). In this case, a plurality of specific information SV correlated with the identification information ID may be outputted as the retrieval result (TSV).

Figure 7:
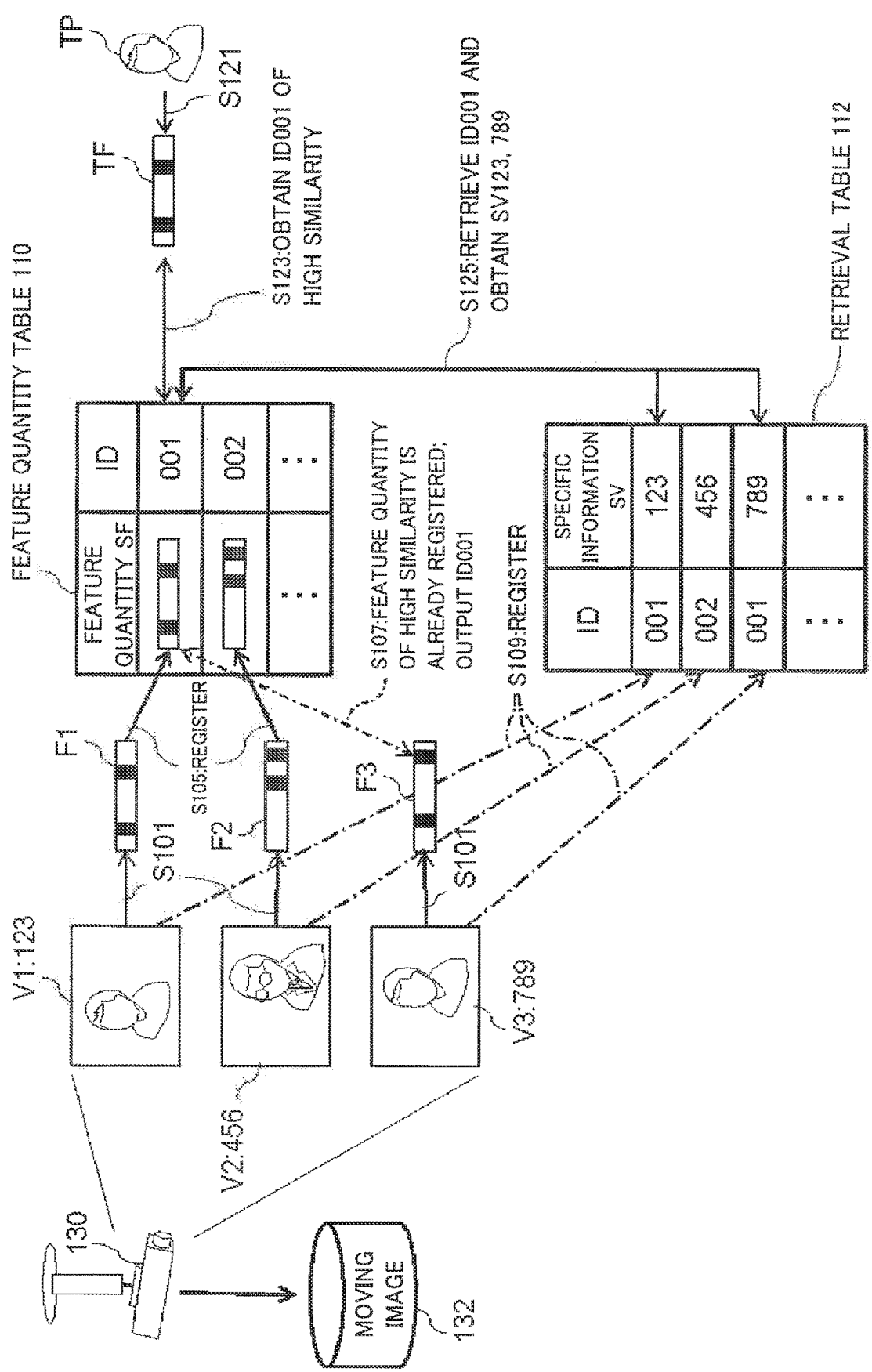
FIG. 7 is a diagram illustrating a series of operations using a video similarity determination process using the information processing device according to the exemplary embodiment of the present invention by way of example.

A series of operations of the information processing device 100 of FIG. 1 and the information processing device 120 of FIG. 5 of the present invention will be described below using a similarity determination process of a video of the surveillance camera 130 by way of example using FIG. 7.

First, in the information processing device 100, the feature quantity table 110 for managing the pair of feature quantity SF and identification information ID thereof is prepared. The video photographed by the surveillance camera 130 is recorded in the moving image storage unit 132 as moving image data.

In this example, while saving the video of the surveillance camera in the moving image storage unit 132 as the moving image data, the feature quantity Fi of the person appearing in the video is extracted, and the specific information Vi such as the frame number of the moving image data and the camera number are provided to the information processing device 100.

At the time of retrieval, the information processing device 120 extracts the feature quantity TF such as the face image of the person from the retrieving image TP which is the target, and outputs the frame number of the similar feature quantity as the retrieval result. The moving image data then can be retrieved using the frame number.

Firstly, the feature quantity Fi of the object of the retrieval target, that is, the face image of the person is extracted from each frame of the moving image data recorded in the moving image storage unit 132. In this case, the number of the frame in which the feature quantity Fi of the face image is extracted is assumed as the specific information Vi of the feature quantity. The pair of the feature quantity Fi and the specific information Vi is inputted to the feature quantity obtaining unit 102 of the information processing device 100, whereby the registration of such information is requested by the information processing device 100 (step S101).

The feature quantity holding unit 104 then checks if the feature quantity which is similar to the inputted feature quantity Fi is already saved in the feature quantity table 110. For example, when saving the feature quantity F1 of the image of frame 1 with the frame number 123 which is the specific information V1, it can be found that the feature quantity F1 is not saved since the feature quantity table 110 is empty at first. In this case, in order to save the relevant feature quantity F1 in the feature quantity table 110, the feature quantity holding unit 104 assigns new identification information ID to the feature quantity F1, correlates the assigned identification information ID with the feature quantity F1, and saves such pair in the feature quantity table 110 (step S105). In this example, "001" is assigned for the identification information ID.

In the retrieval table holding unit 106, the retrieval table 112 is prepared to save the frame number as the specific information Vi. The retrieval table holding unit 106 correlates "001", which is the identification information ID of the feature quantity F1, with 123, which is the frame number V1, and saves such pair in the retrieval table 112 (step S109).

Before saving the feature quantity F2 of the image of frame 2 with the frame number V2:456, the feature quantity holding unit 104 compares the similarity with the feature quantity SF1 of the image of frame 1 saved before. In this case, the similarity is lower than a certain threshold, and thus the feature quantity holding unit 104 assigns "002" as the new identification information ID on the feature quantity F2, and saves the same in the feature quantity table 110 (step S105). Similarly for the retrieval table 112, the retrieval table holding unit 106 correlates the identification information ID "002" with the frame number V2:456, and saves such pair (step S109).

A case of saving the feature quantity F3 of the image of frame 3 with the frame number V3:789 is now considered. In this case, the similarity with the feature quantity SF1 of the image of frame 1 saved before is greater than or equal to the threshold, hence the feature quantity holding unit 104 does not newly save the feature quantity F3, and outputs "001", which is the identification information ID of the feature quantity SF1 of the image of frame 1 (step S107). The retrieval table holding unit 106 then correlates the identification information ID:001 with the frame number V3:789, and saves such pair in the retrieval table 112 (step S109).

An operation of when the information processing device 120 retrieves an object to be specified, for example, the face image TP of a person who is the target from a video photographed with the surveillance camera 130 using the feature quantity table 110 and the retrieval table 112 created in the above manner will now be described.

First, in the information processing device 120, the feature quantity TF of the person extracted from the retrieving image TP is assumed as the input of the first retrieving unit 122 (step S121). The first retrieving unit 122 then compares the feature quantity TF with the feature quantity SF in the feature quantity table 110, and retrieves the feature quantity having a similarity which is greater than or equal to the threshold. In this example, the feature quantity in which the identification information ID is "001" is retrieved as having a similarity which is greater than or equal to the threshold by the first retrieving unit 122 (step S123).

The second retrieving unit 124 then retrieves in the retrieval table 112 to search for the ID of "001". In this example, "123" and "789" are retrieved as the specific information SV (step S125). The moving image data in the moving image storage unit 132 is retrieved based on the frame number of the retrieval result obtained in the above manner, so that the video of the person who is the target can be checked.

According to such operation, even if the registration of the feature quantity having a high similarity with the previously saved feature quantity is requested, such feature quantity is not actually saved in the feature quantity table 110, hence the data capacity of the feature quantity to be saved can be suppressed. Furthermore, the number of feature quantities for calculating the similarity at the time of retrieval needs to be only the number registered in the feature quantity table 110, whereby the cost at the time of retrieval can be suppressed. Moreover, since the approximation is not used as differed from the system described in the patent literature described above, the retrieval of higher accuracy can be realized.

As described above, the information processing device 120 of the exemplary embodiment of the present invention has the effects which are similar to that of the above-described exemplary embodiment, and also has the effects described above as a large amount of feature quantities does not need to be saved. Furthermore, when retrieving the specific information SV from the identification information ID with the second retrieving unit 124, the specific information SV can be efficiently retrieved by using the retrieving method that employs a typical index, and the like.

Third Exemplary Embodiment

Figure 8:
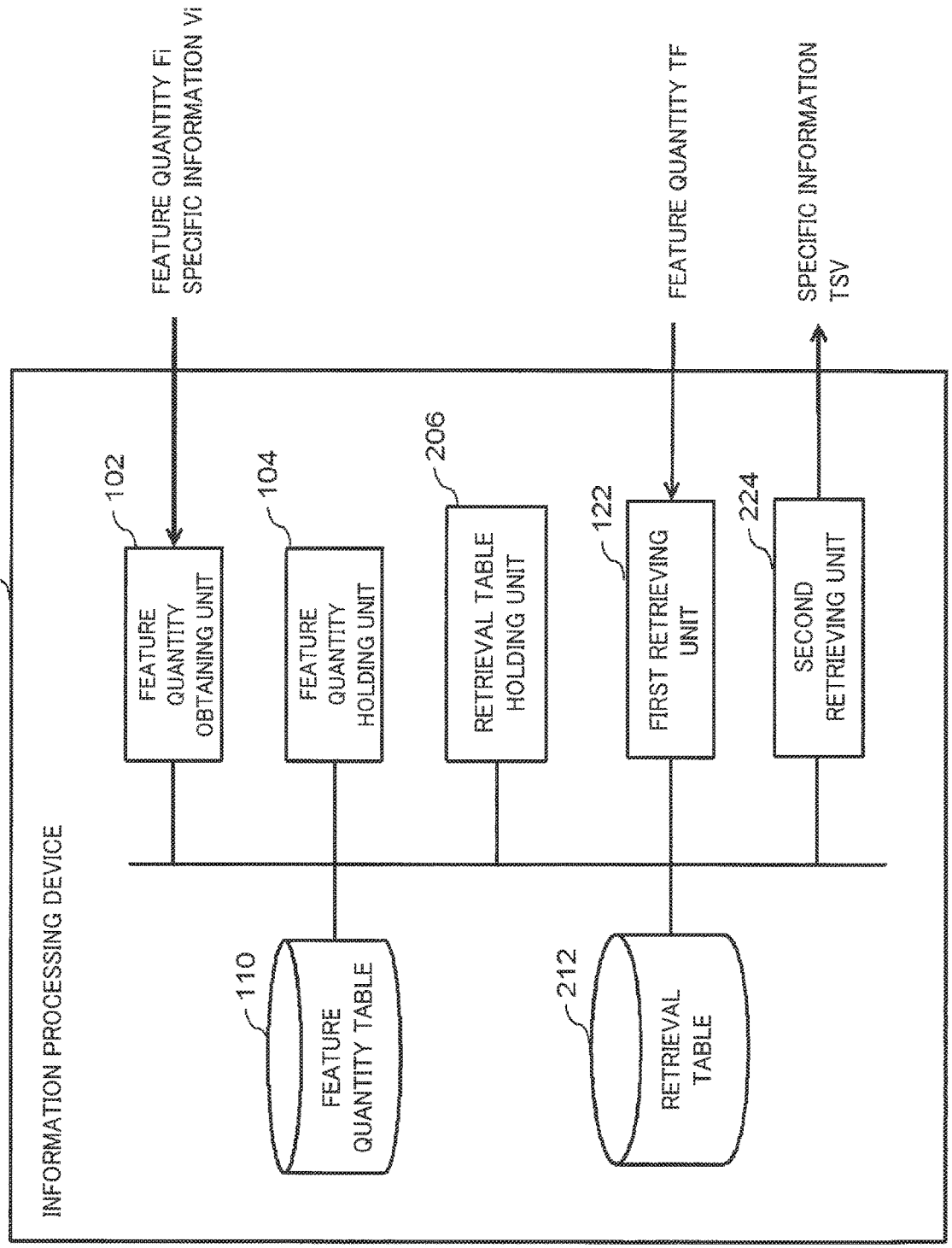
FIG. 8 is a function block diagram illustrating a logical configuration of an information processing device according to an exemplary embodiment of the present invention.

FIG. 8 is a function block diagram illustrating a logical configuration of an information processing device 200 according to an exemplary embodiment of the present invention.

The information processing device 200 of the present exemplary embodiment differs from the above-described exemplary embodiments in that the feature quantity is also held in the retrieval table and such feature quantity is used at the time of retrieval to enhance the detection accuracy of the object of the retrieval target.

The information processing device 200 of the present exemplary embodiment includes the feature quantity obtaining unit 102, the feature quantity holding unit 104, the first retrieving unit 122, and the feature quantity table 110, which are similar to the above-described exemplary embodiments, and also includes a retrieval table 212, a retrieval table holding unit 206, and a second retrieving unit 224.

The information processing device 200 of the present exemplary embodiment also includes the configuration of the information processing device 120 of the above-described exemplary embodiment of FIG. 5, and is integrated with the information processing device 120, but this is not the sole case. The configurations of the registration process and the retrieval process may be respectively realized in different devices as in the above-described exemplary embodiments.

Figure 9:
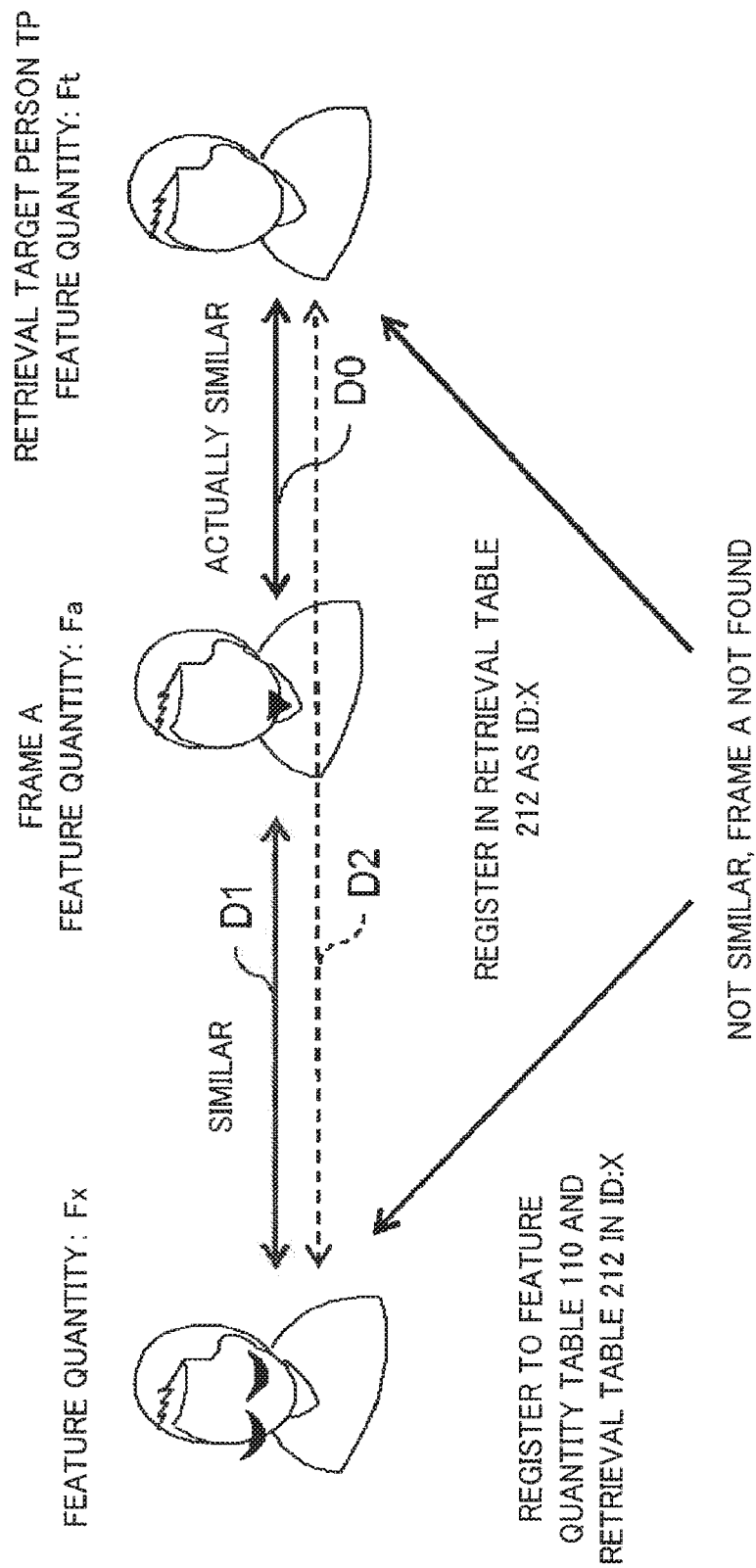
FIG. 9 is a diagram describing a method for setting a threshold for similarity determination in the information processing device according to the exemplary embodiment of the present invention.

Different values can be set for the first threshold used for the similarity determination when registering the feature quantity in the feature quantity table 110, and the second threshold used for retrieving the feature quantity table 110 and determining the similarity when carrying out the retrieval, as described above. Thus, the relationship in the example illustrated in FIG. 9 may be met depending on the manner of setting.

For example, since a feature quantity Fa extracted from a frame A is close to a feature quantity Fx already registered in the feature quantity table 110, the feature quantity Fa is assumed to be registered in the retrieval table 212 as the identification information ID:X. In this case, the feature quantity Fa is not registered in the feature quantity table 110.

Next, at the time of retrieval, the feature quantity Ft extracted from the image of the retrieval target person TP who is the target is assumed to be similar (close) to the feature quantity Fa of the frame A, but not similar (distant) to the feature quantity Fx registered in the feature quantity table 110 as the identification information ID:X. In this case, the feature quantity Fa of the frame A registered in the retrieval table 212 as the identification information ID:X is not registered in the feature quantity table 110, and thus the frame A that is actually similar to the retrieval target person TP cannot be found.

Therefore, the second threshold D2 used at the time of retrieval needs to be lower than a threshold D0, which is to be actually specified for the retrieval condition, so that even the feature quantity (e.g., Fx) with more distant similarity can be hit in the retrieval. For example, if the similarity can be represented as a distance, the second threshold D2 is obtained by adding the first threshold D1 (distance) used at the time of registration to the threshold D0 (distance) which is to be actually specified at the time of retrieval. The feature quantity Fx having the identification information ID:X in FIG. 9 thus can be found. In the present exemplary embodiment, the second threshold used at the time of retrieval is assumed to be a value lower than the first threshold used at the time of registration. The retrieval leakage thus can be reduced.

Thus, if the second threshold at the time of retrieval is lower than the first threshold at the time of registration, a plurality of feature quantities are sometimes found as being greater than or equal to the second threshold at the time of retrieval. In this case, the retrieval table 212 is retrieved with respect to all the identification information ID corresponding to the found feature quantities.

In such a case, the feature quantity which is actually desired to be excluded at the time of retrieval, is also obtained as the retrieval result may occur. In order to exclude such feature quantity, in the present exemplary embodiment, the feature quantity is simultaneously saved in the retrieval table 212, the similarity is re-calculated before outputting the retrieval result, and the feature quantity, in which the similarity is higher than the threshold which is actually desired to be specified, is merely outputted. However, in this case, the feature quantities of all the frames need to be saved.

FIG. 10 is a diagram illustrating one example of a structure of the retrieval table 212 of the present exemplary embodiment.

In the present exemplary embodiment, the retrieval table 212 also holds the feature quantity SF in correlation with the identification information ID, in addition to the specific information SV.

In the present exemplary embodiment, the retrieval table holding unit 206 further associates the feature quantity SF obtained by the feature quantity obtaining unit 102 with the identification information ID, and holds the same in the retrieval table 212, in addition to the specific information SV. When the first retrieving unit 122 receives the target feature quantity TF of the object to be specified, the first retrieving unit 122 references the feature quantity table 110, retrieves the feature quantity in which the similarity with the received target feature quantity TF is greater than or equal to the second threshold (second similarity) in the feature quantity table 110, and obtains the identification information corresponding to the found feature quantity from the feature quantity table 110, similar to the above-described exemplary embodiment.

The second retrieving unit 224 references the retrieval table 212, retrieves the identification information obtained by the first retrieving unit 122 in the retrieval table 212, and obtains the feature quantity corresponding to the found identification information from the retrieval table 212.

Furthermore, if a plurality of feature quantities are found by the second retrieving unit 224, the second retrieving unit 224 computes the similarity with the target feature quantity for each of the plurality of found feature quantities, and obtains the specific information correlated with the feature quantity in which the computed similarity is greater than or equal to the first threshold (first similarity) from the retrieval table 212.

The operation of the information processing device 200 of the present exemplary embodiment configured as above will be described below.

In the information processing device 200, the process at the time of registration of the feature quantity is similar in all aspects with the information processing device 100 of the exemplary embodiment described above other than that the retrieval table holding unit 206 also correlates the feature quantity with the identification information ID along with the specific information and holds the same in the retrieval table 212. As illustrated in FIG. 10, the following retrieval process is carried out after correlating and holding the identification information ID, the feature quantity SF, and the specific information SV in the retrieval table 212 by means of the retrieval table holding unit 206.

Figure 11:
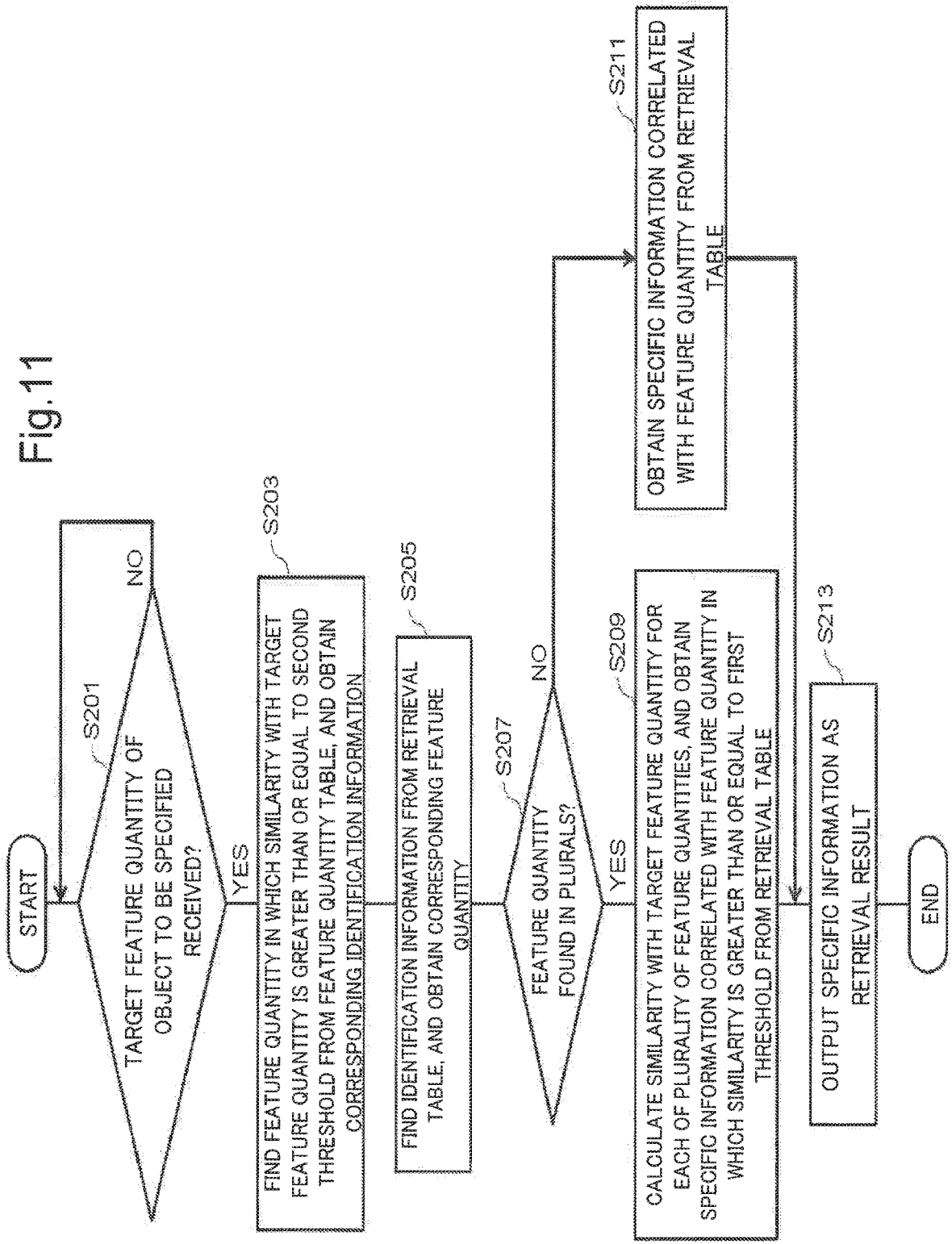
FIG. 11 is a flowchart illustrating one example of the operation at the time of retrieval of the information processing device according to the exemplary embodiment of the present invention.

FIG. 11 is a flowchart illustrating one example of the operation at the time of retrieval of the information processing device 200 according to the exemplary embodiment of the present invention.

First, in the information processing device 200 of the present exemplary embodiment, the present process is started when the first retrieving unit 122 receives the target feature quantity TF of the object to be specified (YES in step S201).

The first retrieving unit 122 then references the feature quantity table 110, retrieves the feature quantity in which the similarity with the received target feature quantity TF is greater than or equal to the second threshold in the feature quantity table 110, and obtains the identification information corresponding to the found feature quantity from the feature quantity table 110 (step S203).

The second retrieving unit 224 references the retrieval table 212, retrieves the identification information obtained by the first retrieving unit 122 in the retrieval table 212, and obtains the feature quantity corresponding to the found identification information from the retrieval table 212 (step S205).

If a plurality of feature quantities are found by the second retrieving unit 224 (YES in step S207), the second retrieving unit 224 computes the similarity with the target feature quantity TF for each of the plurality of found feature quantities, and obtains the specific information correlated with the feature quantity in which the computed similarity is greater than or equal to the first threshold from the retrieval table 212 (step S209).

If the feature quantity found by the second retrieving unit 224 is not in plurals (NO in step S207), the second retrieving unit 224 obtains the specific information correlated with the found feature quantity from the retrieval table 212 (step S211).

The second retrieving unit 224 outputs the specific information obtained in step S209 or step S211 as the retrieval result (step S213). For example, in the example of the retrieval table 212 of FIG. 10, three feature quantities of Fx, Fa, and Fb are obtained. The similarity with the target feature quantity TF is re-calculated respectively, and only the frames 12 and 34 of the feature quantities Fx and Fa, which are actually similar, are outputted as the retrieval result.

As described above, the information processing device 200 of the exemplary embodiment of the present invention has the effects similar to that of the above-described exemplary embodiments, and can also carry out a highly accurate similarity determination at the time of retrieval.

Describing an example of a surveillance camera as another example, a frame number obtained as the specific information from the moving image data of the separately saved video may be used to extract the relevant frame, and the extraction of the feature quantity may be carried out again. In this case, the feature quantity does not need to be saved in the retrieval table 212.

Figure 12:
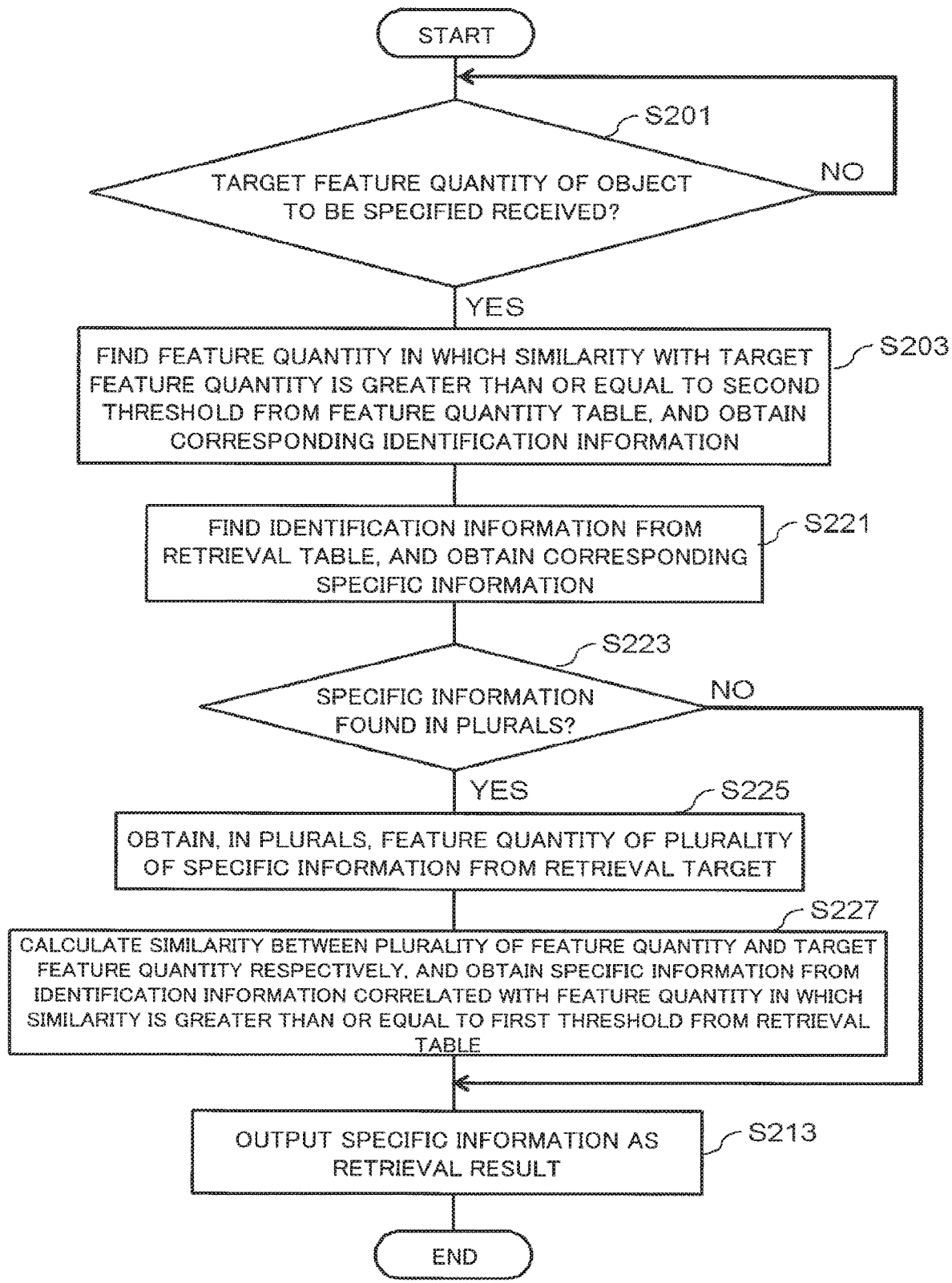
FIG. 12 is a flowchart illustrating one example of the operation at the time of retrieval of the information processing device according to the exemplary embodiment of the present invention.

FIG. 12 is a flowchart illustrating one example of the operation at the time of retrieval of the information processing device 200 according to the exemplary embodiment of the present invention.

In the information processing device 200 of the present exemplary embodiment, the present process is started when the first retrieving unit 122 receives the target feature quantity TF of the object to be specified (YES in step S201).

The first retrieving unit 122 references the feature quantity table 110, retrieves the feature quantity having a similarity which is greater than or equal to the second similarity which is lower than the first similarity, with the received target feature quantity TF in the feature quantity table 110, and obtains the identification information corresponding to the found feature quantity from the feature quantity table 110 (step S203).

The second retrieving unit 224 references the retrieval table 212, retrieves the identification information obtained by the first retrieving unit 122 in the retrieval table 212, and obtains the specific information corresponding to the found identification information from the retrieval table 212 (step S221).

If a plurality of specific information is found by the second retrieving unit 224 (YES in step S223), the feature quantity obtaining unit 102 obtains, in plurals, the feature quantity at the appearing location specified with the plurality of specific information obtained by the second retrieving unit 224 from retrieval target (step S225). The second retrieving unit 224 computes the similarity with the target feature quantity TF for each of the plurality of obtained feature quantities, obtains the feature quantity in which the computed similarity is greater than or equal to the first similarity, references the retrieval table 212, and obtains the corresponding specific information from the identification information correlated with the obtained feature quantity (step S227).

The second retrieving unit 224 then outputs the specific information obtained in step S221 or step S227 as a detection result (step S213).

As described above, the information processing device 200 of the exemplary embodiment of the present invention has the effects similar to that of the above-described exemplary embodiments, and can also carry out an accurate similarity determination at the time of retrieval as the feature quantity does not need to be held in the retrieval table 212.

Fourth Exemplary Embodiment

Figure 13:
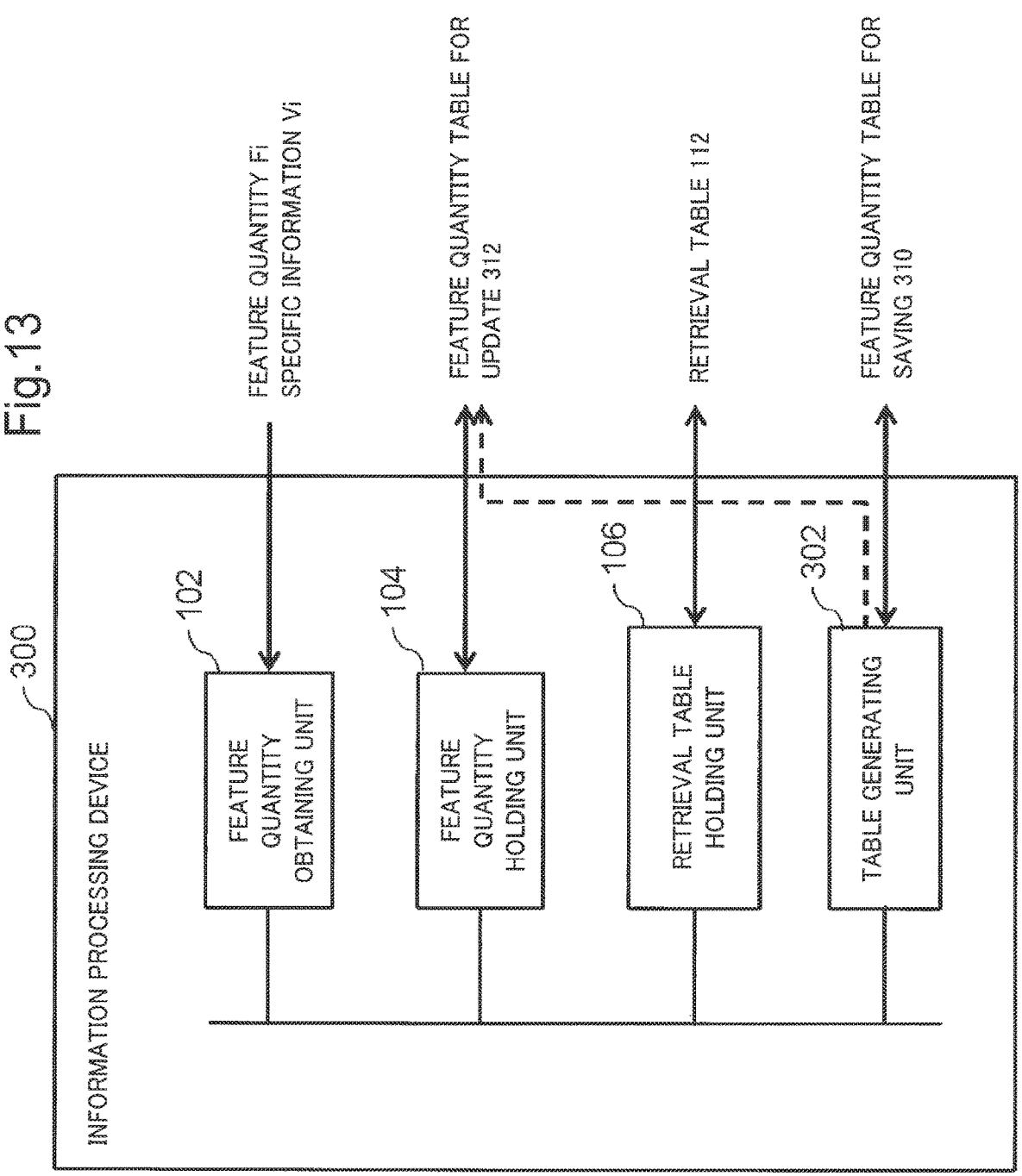
FIG. 13 is a function block diagram illustrating a logical configuration of an information processing device according to an exemplary embodiment of the present invention.

FIG. 13 is a function block diagram illustrating a logical configuration of an information processing device 300 according to an exemplary embodiment of the present invention.

The information processing device 300 of the present exemplary embodiment differs from the above-described exemplary embodiments in that the feature quantity table 110 is divided or created the new feature quantity table 110 when the capacity of the feature quantity table 110 becomes large.

In FIG. 13, the information processing device 300 has a configuration which is similar to that of the information processing device 100 of the exemplary embodiment of FIG. 1, and further includes a table generating unit 302.

The information processing device 300 of the present exemplary embodiment may have a configuration which is similar to that of the information processing device 120 of the exemplary embodiment of FIG. 5 or the information processing device 200 of the exemplary embodiment of FIG. 8.

The information processing device 300 of the present exemplary embodiment further includes the table generating unit 302. The table generating unit 302 divides or newly creates the feature quantity table 110 when the capacity of the feature quantity table 110 becomes greater than or equal to the threshold, and generates a feature quantity table for saving (past) 310 and a feature quantity table for update 312.

The feature quantity holding unit 104 uses the feature quantity table for update 312.

As described in the above-described exemplary embodiments, at the time of data saving, whether or not the similar feature quantity is saved in the feature quantity table 110 is retrieved, and if not saved, a new feature quantity is added. Therefore, even if the same person appears numerous times, the feature quantity table 110 becomes large if the data of numerous frames are saved. When the feature quantity table 110 becomes large, it takes time for retrieval of the feature quantity table 110 at the time of data saving, and thus the data saving for every frame may not be carried out on time.

In order to solve such problem, when the feature quantity table becomes large to a certain extent, such table is saved as a "past feature quantity table" in a different location, and the feature quantity table is cleared. This state is illustrated in FIG. 14. The feature quantity table for update 312 is saved in the memory 64 so as to be accessed at the time of data saving, and the feature quantity table for saving 310 may be saved in a disc so as to be accessed only at the time of retrieval. When the feature quantity table for update 312 again becomes large which is greater than or equal to a certain extent, such table may be added to the end of the feature quantity table for saving 310, or a different feature quantity table (not shown) for saving may be created. After clearing the feature quantity table for update 312, identification information ID which is different from the identification information ID used hitherto is assumed to be used to register the feature quantity in the feature quantity table 312.

In the information processing device 300 of the present exemplary embodiment, the operation at the time of data saving (registration of the feature quantity and the specific information) is no different from that of the exemplary embodiments described above other than the saving to the feature quantity table for saving 310 and the clearing of the feature quantity table for update 312.

Therefore, the description on the operation at the time of registration will be omitted. Hereinafter, the operation at the time of retrieval will be described by an example of using the information processing device 120 of the above-described exemplary embodiment of FIG. 5.

FIG. 15 is a flowchart illustrating one example of the operation at the time of retrieval of the information processing device 120.

At the time of retrieval, the first retrieving unit 122 first receives the target feature quantity TF (step S121).

The first retrieving unit 122 also retrieves the feature quantity having a high similarity with the target feature quantity TF for the feature quantity saved in the feature quantity table for saving 310, in addition to the feature quantity table for update 312 (step S301). The feature quantity table for update 312 is once cleared and then the new feature quantity is added, hence similar feature quantities may be saved in the feature quantity table for saving 310 and the feature quantity table for update 312. In this case, both the feature quantity table for update 312 and the feature quantity table for saving 310 are retrieved, so that a plurality of feature quantities and the corresponding identification information ID are obtained.

The first retrieving unit 122 compares the target feature quantity with the feature quantity in the feature quantity table for update 312 and the feature quantity table for saving 310, and retrieves and obtains the identification information having a similarity which is greater than or equal to the threshold.

The retrieval table 112 is retrieved using the plurality of identification information ID, and the corresponding specific information is obtained from the retrieval table 112 (step S125).

For example, as illustrated in FIG. 14, the feature quantity similar to the feature quantity of ID:2 of the feature quantity table for saving 310 is also registered in ID:n+1 of the feature quantity table for update 312. If the target feature quantity TF is similar to such feature quantities, ID:2 and ID:n+1 are obtained by the first retrieving unit 122. The second retrieving unit 124 obtains the specific information 456 and 1011 corresponding to ID:2 and ID:n+1 from the retrieval table 112.

If the feature quantity is saved as in the retrieval table 212, such feature quantity is retrieved. Alternatively, the original data that generated the feature quantity therefrom is retrieved using a value saved in the retrieval table 112 to re-generate the feature quantity.

The similarity between the obtained feature quantity and the feature quantity provided as the input of the first retrieving unit 122 is calculated, and only the value corresponding to the feature quantity having a similarity which is greater than or equal to the threshold is outputted.

However, such steps may be omitted. In such a case, the specific information obtained by retrieving the retrieval table 112 from the ID is outputted as it is.

In FIG. 14, when the feature quantity table becomes large to a certain extent, all the data of the feature quantity table are copied to the feature quantity table for saving 310, and the feature quantity table for update 312 is cleared. However, all of the feature quantity table for update 312 does not need to be cleared. For example, only one part may be copied to the feature quantity table for saving, and only the copied entry may be deleted from the feature quantity table for update 312. This state is illustrated in FIG. 16.

In such a case, there is a choice on which entry to be targeted for "copy from feature quantity table for update 312 to feature quantity table for saving 310" or "deletion from feature quantity table for update 312" (hereinafter referred to as clean-out). The method referred to as LRU (Least Recently Used) may be used as one example of such selecting method. In the LRU, the entry that is not recently used the most is selected and cleaned-out. In order to realize the LRU, for example, a list (LRU list 320) for saving the ID in the recently used order may be provided. The ID determined to have high similarity at the time of saving or the ID hit at the time of retrieval is retrieved from the LRU list 320, and moved to the head of the list 320. Accordingly, the ID at the end of the list 320 is the entry which is recently not used the most, and becomes the target of clear-out.

The information processing device 300 of the present exemplary embodiment may further include a table updating unit (not shown) that holds a usage state of the identification information at the time of reference of the feature quantity table or the retrieval table, and moves data (record) of the identification information that is not used the most from the feature quantity table for update 312 to the feature quantity table for saving 310 based on the usage state uses the LRU (Least Recently Used) method.

The operation of the information processing device of the present exemplary embodiment configured as above will now be described.

FIG. 17 is a flowchart illustrating one example of an operation of the information processing device according to the exemplary embodiment of the present invention.

The present process is started when the feature quantity does not exist in the feature quantity table (NO in step S103) in step S103 of the flowchart of FIG. 4 of the above-described exemplary embodiment.

First, the table updating unit examines whether or not the size of the feature quantity table for update 312 is greater than a certain size (whether or not greater than or equal to threshold) (step S401).

If greater (YES in step S401), the table updating unit copies a part of (or all of) the feature quantity table for update 312 to the feature quantity table for saving 310, and deletes the copied entry from the feature quantity table for update 312 (step S403). For selection of the entry, methods such as LRU can be used, as mentioned above. The process then proceeds to next step S109 (FIG. 4).

If not greater (NO in step S401), the process proceeds to next step S109 (FIG. 4).

In such a case, assuming, for example, a case of a surveillance camera in a store, a person who always appears such as a salesclerk is less likely to become the target of clear-out, and thus an event in which a number of feature quantities of high similarity is redundantly saved in the feature quantity table for saving 310 is less likely to occur, and efficiency is realized. A person who does not appear after leaving the store such as a customer, on the other hand, becomes the target of clear-out from the oldest data.

As described above, the information processing device according to the exemplary embodiment of the present invention has the effects similar to that of the above-described exemplary embodiments, and can also realize an efficient similarity retrieval even when the capacity of the feature quantity table becomes large.

The exemplary embodiments of the present invention have been described with reference to the drawings, but such exemplary embodiments are merely illustrative of the present invention, and various other configurations may be adopted.

For example, in the exemplary embodiment described above, the feature quantity and the specific information of the object to be specified obtained by sequentially retrieving the moving image data of the video are obtained, but a frame number, and the like may be specified, and a part of retrieval target may be partially obtained and processed.

The invention of the present application has been described with reference to the exemplary embodiments and the examples, but the invention of the present application should not be limited to the exemplary embodiments and the examples. The configurations and the details of the invention of the present application can be variously changed as recognized by those skilled in the art within a scope of the invention of the present application.

When obtaining and using the information related to a user in the present invention, this is to be carried out lawfully.

Hereinafter, examples of supplemental notes will be described.

1. A data processing method of an information processing device, wherein the information processing device, obtains a feature quantity of an object to be extracted, which is extracted from a retrieval target, and specific information that is capable of specifying an appearing location of the feature quantity in the retrieval target;

when storing the feature quantity in a feature quantity table which holds the obtained feature quantity with identification information added thereto, references the feature quantity table, adds new identification information to the feature quantity and holds the feature quantity in the feature quantity table when a similar feature quantity in which a similarity with the feature quantity is greater than or equal to a first similarity is not held in the feature quantity table, and outputs identification information which is the same as the similar feature quantity as identification information of the feature quantity when the similar feature quantity is held in the feature quantity table; and holds the obtained specific information as a retrieval table in association with the identification information added or outputted for the feature quantity.

2. The data processing method of the information processing device described in 1, wherein the information processing device further:

receives a target feature quantity of an object to be specified, references the feature quantity table, retrieves the target feature quantity and a feature quantity having a similarity which is greater than or equal to the threshold in the feature quantity table, and obtains identification information corresponding to the found feature quantity from the feature quantity table; and references the retrieval table, retrieves the obtained identification information in the retrieval table, and obtains specific information corresponding to the found identification information from the retrieval table.

3. The data processing method of the information processing device according to 2, wherein the information processing device further:

further holds the obtained feature quantity in the retrieval table in association with the identification information, in addition to the specific information; and when receiving the target feature quantity of the object to be specified, references the feature quantity table, retrieves the received target feature quantity and a feature quantity having a similarity which is greater than or equal to a second similarity which is lower than the first similarity in the feature quantity table, and obtains identification information corresponding to the found feature quantity from the feature quantity table, references the retrieval table, retrieves the obtained identification information in the retrieval table, and obtains a feature quantity corresponding to the found identification information from the retrieval table, and when the feature quantity is found in plurals, computes a similarity with the target feature quantity for each of the plurality of found feature quantities, and obtains the specific information correlated with the feature quantity in which the computed similarity is greater than or equal to the first similarity from the retrieval table.

4. The data processing method of the information processing device according to 2, wherein the information processing device further:

when receiving the target feature quantity of the object to be specified, references the feature quantity table, retrieves the received target feature quantity and a feature quantity having a similarity which is greater than or equal to a second similarity which is lower than the first similarity in the feature quantity table, and obtains identification information corresponding to the found feature quantity from the feature quantity table, and references the retrieval table, retrieves the obtained identification information in the retrieval table, and obtains specific information corresponding to the found identification information from the retrieval table; and when the specific information is found in plurals, obtains, in plurals, a feature quantity of the appearing location specified with the plurality of obtained specific information from the retrieval target, and associates the plurality of feature quantities with the corresponding identification information, and computes a similarity with the target feature quantity for each of the plurality of obtained feature quantities, obtains the feature quantity in which the computed similarity is greater than or equal to the first similarity, and obtains the corresponding specific information from the identification information corresponding to the obtained feature quantity.

5. The data processing method of the information processing device according to any of 1 to 4, wherein the information processing device further:

divides the feature quantity table or creates a new feature quantity table to generate a feature quantity table for saving and a feature quantity table for update when a capacity of the feature quantity table becomes greater than or equal to a threshold; and holds the obtained feature quantity in the feature quantity table for update.

6. The data processing method of the information processing device described in 5, wherein the information processing device further:

holds a usage state of the identification information at time of referencing the feature quantity table or the retrieval table, and moves data (record) of the identification information which is not used the most from the feature quantity table for update to the feature quantity table for saving based on the usage state using an LRU (Least Recently Used) method.

7. A program for causing a computer to execute procedures of:

obtaining a feature quantity of an object to be extracted, which is extracted from a retrieval target, and specific information that is capable of specifying an appearing location of the feature quantity in the retrieval target;

when storing the feature quantity in a feature quantity table which holds the obtained feature quantity with identification information added thereto, referencing the feature quantity table, adding new identification information to the feature quantity and holding the feature quantity in the feature quantity table when a similar feature quantity, in which a similarity with the feature quantity is greater than or equal to a first similarity, is not held in the feature quantity table, and outputting identification information which is the same as the similar feature quantity as identification information of the feature quantity when the similar feature quantity is held in the feature quantity table; and holding the obtained specific information as a retrieval table in association with the identification information added or outputted for the feature quantity.

8. The program according to 7, further causing the computer to execute the procedures of:

receiving a target feature quantity of an object of to be specified, referencing the feature quantity table, retrieving the target feature quantity and a feature quantity having a similarity which is greater than or equal to the first similarity in the feature quantity table, and obtaining identification information corresponding to the found feature quantity from the feature quantity table; and referencing the retrieval table, retrieving the obtained identification information in the retrieval table, and obtaining specific information corresponding to the found identification information from the retrieval table.

9. The program according to 8, further causing the computer to execute the procedures of:

further holding the obtained feature quantity in the retrieval table in association with the identification information, in addition to the specific information; and when receiving the target feature quantity of the object to be specified, referencing the feature quantity table, retrieving the received target feature quantity and a feature quantity having a similarity which is greater than or equal to a second similarity which is lower than the first similarity in the feature quantity table, and obtaining identification information corresponding to the found feature quantity from the feature quantity table, referencing the retrieval table, retrieving the obtained identification information in the retrieval table, and obtaining a feature quantity corresponding to the found identification information from the retrieval table, and when the feature quantity is found in plurals, computing a similarity with the target feature quantity for each of the plurality of found feature quantities, and obtaining the specific information correlated with the feature quantity in which the computed similarity is greater than or equal to the first similarity from the retrieval table.

10. The program according to 8, further causing the computer to execute the procedures of:

when receiving the target feature quantity of the object to be specified, referencing the feature quantity table, retrieving the received target feature quantity and a feature quantity having a similarity which is greater than or equal to a second similarity which is lower than the first similarity in the feature quantity table, and obtaining identification information corresponding to the found feature quantity from the feature quantity table, and referencing the retrieval table, retrieving the obtained identification information in the retrieval table, and obtaining specific information corresponding to the found identification information from the retrieval table; and when the specific information is found in plurals, obtaining, in plurals, a feature quantity of the appearing location specified with the plurality of obtained specific information from the retrieval target, and associating the plurality of feature quantities with the corresponding identification information, and computing a similarity with the target feature quantity for each of the plurality of obtained feature quantities, obtaining the feature quantity in which the computed similarity is greater than or equal to the first similarity, and obtaining the corresponding specific information from the identification information corresponding to the obtained feature quantity.

11. The program according to any of 7 to 10, further causing the computer to execute the procedures of:

dividing the feature quantity table or creating a new feature quantity table to generate a feature quantity table for saving and a feature quantity table for update when a capacity of the feature quantity table becomes greater than or equal to a threshold; and holding the obtained feature quantity in the feature quantity table for update.

12. The program according to 11, further causing the computer to execute the procedure of:

holding a usage state of the identification information at time of referencing the feature quantity table or the retrieval table, and moving data (record) of the identification information which is not used the most from the feature quantity table for update to the feature quantity table for saving based on the usage state using an LRU (Least Recently Used) method.

This application claims the priority on the basis of Japanese Patent Application No. 2013-040645 filed on Mar. 1, 2013, the disclosure of which is incorporated herein by its entirety.

The invention claimed is:

1. An information processing device comprising:
a memory configured to:
store a first feature quantity table which stores a plurality of pairs each comprising a registered feature quantity of an object and a registered object identifier which is an identifier of the object;
store a second feature quantity table which stores a plurality of pairs that are moved from the first feature quantity table; and
store a retrieval table which stores a plurality of pairs each comprising a registered object identifier and a registered image identifier which is an identifier of an image including the object; and
a processor coupled to the memory and configured to:
acquire a pair comprising an acquired feature quantity and an acquired image identifier extracted from an object in a video of a surveillance camera;
search, upon acquiring the pair comprising the acquired feature quantity and the acquired image identifier, the first feature quantity table for a registered feature quantity similar to the acquired feature quantity, without searching the second feature quantity table;
output a value corresponding to the searched registered feature quantity;
extract a registered object identifier associated with the registered feature quantity similar to the acquired feature quantity from the plurality of pairs in the first feature quantity table; and
search the retrieval table for the extracted registered object identifier to check for a target person in the video,
wherein the processor is further configured to:
when the registered feature quantity similar to the acquired feature quantity is not stored in the first feature quantity table, register a pair comprising the acquired feature quantity and a new object identifier into the first feature quantity table, and register the pair comprising the acquired image identifier and the new object identifier into the retrieval table;
when the registered feature quantity similar to the acquired feature quantity is stored in the first feature quantity table, retrieve the registered object identifier associated with the similar registered feature quantity from the first feature quantity table, and store a pair comprising the retrieved registered object identifier and the acquired image identifier into the retrieval table;
move, when an amount of data held in the first feature quantity table becomes greater than or equal to a threshold, one or more pairs from the first feature quantity table to the second feature quantity table;
hold a usage state of the identification information at the time of reference of the first feature quantity table or the retrieval table; and
move data of the identification information not being used the most from the first feature quantity table to the second feature quantity table for saving based on the usage state by using the Least Recently Used method.

2. The information processing device according to claim 1, wherein the first feature quantity table, the second feature quantity table and the retrieval table store, as the image identifier, any one or a combination of a frame number of a moving image data, an identifier of a camera, a photographed location, a photographed date and time, and an identifier of a recording medium.

3. The information processing device according to claim 1,
wherein the memory is further configured to store a list comprising a plurality of object identifiers, and
wherein the processor is further configured to:
move an object identifier, among the plurality of object identifiers, identified by a search or a retrieval by the processor to a head of the list, and
select, when moving the one or more pairs, one or more pairs including an object identifier corresponding to an object identifier, among the plurality of object identifiers, at an end of the list as pairs to be moved.

4. An information processing method executed by a processor coupled to a memory which stores a first feature quantity table, a second feature quantity table, and a retrieval table comprising:

storing a plurality of pairs each comprising a registered feature quantity of an object and a registered object identifier which is an identifier of the object in the first feature quantity table;

storing plurality of pairs that are moved from the first feature quantity table in the second feature quantity table;

storing a plurality of pairs each comprising a registered object identifier and a registered image identifier which is an identifier of an image including the object in the retrieval table; and acquiring a pair comprising an acquired feature quantity and an acquired image identifier extracted from an object in a video of a surveillance camera;

searching, upon acquiring the pair comprising the acquired feature quantity and the acquired image identifier, the first feature quantity table for a registered feature quantity similar to the acquired feature quantity, without searching the second feature quantity table;

outputting a value corresponding to the searched registered feature quantity;

extracting a registered object identifier associated with the registered feature quantity similar to the acquired feature quantity from the plurality of pairs in the first feature quantity table; and searching the retrieval table for the extracted registered object identifier to check for a target person in the video, wherein the method further comprises:

when the registered feature quantity similar to the acquired feature quantity is not stored in the first feature quantity table, registering a pair comprising the acquired feature quantity and a new object identifier into the first feature quantity table, and registering the pair comprising the acquired image identifier and the new object identifier into the retrieval table;

when the registered feature quantity similar to the acquired feature quantity is stored in the first feature quantity table, retrieving the registered object identifier associated with the similar registered feature quantity from the first feature quantity table, and storing a pair comprising the retrieved registered object identifier and the acquired image identifier into the retrieval table;

moving, when an amount of data held in the first feature quantity table becomes greater than or equal to a threshold, one or more pairs from the first feature quantity table to the second feature quantity table;

holding a usage state of the identification information at the time of reference of the first feature quantity table, the second feature quantity table, or the retrieval table; and moving data of the identification information not being used the most from the first feature quantity table to the second feature quantity table for saving based on the usage state by using Least Recently Used method.

5. The information processing method according to claim 4, wherein the feature quantity table and the retrieval table store, as the image identifier, any one or a combination of a frame number of a moving image data, an identifier of a camera, a photographed location, a photographed date and time, and an identifier of a recording medium.

6. The information processing method according to claim 4, further comprising:

storing a list comprising a plurality of object identifiers;

moving an object identifier, among the plurality of object identifiers, hit by the searching or the retrieving to a head of the list; and selecting, when moving the one or more pairs, one or more pairs including an object identifier corresponding to an object identifier, among the plurality of object identifiers, at an end of the list as pairs to be moved.

7. A non-transitory computer-readable storage medium storing a program that executed by a computer including a processor coupled to a memory which stores a first feature quantity table, a second feature quantity table, and a retrieval table, the program causes a computer to perform:

storing a plurality of pairs each comprising a registered feature quantity of an object and a registered object identifier which is an identifier of the object in the first feature quantity table;

storing a plurality of pairs that are moved from the first feature quantity table in the second feature quantity table;

storing a retrieval table which stores a plurality of pairs each comprising a registered object identifier and a registered image identifier which is an identifier of an image including the object in retrieval table;

acquiring a pair comprising an acquired feature quantity and an acquired image identifier extracted from an object in a video of a surveillance camera;

searching, upon acquiring the pair comprising the acquired feature quantity and the acquired image identifier, the first feature quantity table for a registered feature quantity similar to the acquired feature quantity, without searching the second feature quantity table;

outputting a value corresponding to the searched registered feature quantity;

extracting a registered object identifier associated with the registered feature quantity similar to the acquired feature quantity from the plurality of pairs in the first feature quantity table; and searching the retrieval table for the extracted registered object identifier to check for a target person in the video, wherein the method further comprises:

when the registered feature quantity similar to the acquired feature quantity is not stored in the first feature quantity table, registering a pair comprising the acquired feature quantity and a new object identifier into the first feature quantity table, and registering the pair comprising the acquired image identifier and the new object identifier into the retrieval table;

when the registered feature quantity similar to the acquired feature quantity is stored in the first feature quantity table, retrieving the registered object identifier associated with the similar registered feature quantity from the first feature quantity table, and storing a pair comprising the retrieved registered object identifier and the acquired image identifier into the retrieval table;

moving, when an amount of data held in the first feature quantity table becomes greater than or equal to a threshold, one or more pairs from the first feature quantity table to the second feature quantity table;

holding a usage state of the identification information at the time of reference of the first feature quantity table, the second feature quantity table, or the retrieval table; and moving data of the identification information not being used the most from the first feature quantity table to the second feature quantity table for saving based on the usage state by using Least Recently Used method.

8. The storage medium according to claim 7, wherein the feature quantity table and the retrieval table store, as the image identifier, any one or a combination of a frame number of a moving image data, an identifier of a camera, a photographed location, a photographed date and time, and an identifier of a recording medium.

9. The storage medium according to claim 7, wherein the program further causes the computer to perform:

storing a list comprising a plurality of object identifiers;

moving an object identifier, among the plurality of object identifiers, hit by the searching or the retrieving to a head of the list; and selecting, when moving the one or more pairs, one or more pairs including an object identifier corresponding to an object identifier, among the plurality of object identifiers, at an end of the list as pairs to be moved.

* * * * *